US008885541B2

(12) United States Patent
Gorokhov et al.

(10) Patent No.: US 8,885,541 B2
(45) Date of Patent: Nov. 11, 2014

(54) EXTENSION OF UE-RS TO DWPTS

(75) Inventors: Alexei Yurievitch Gorokhov, San Diego, CA (US); Juan Montojo, San Diego, CA (US); Amir Farajidana, Sunnyvale, CA (US); Kapil Bhattad, San Diego, CA (US); Brian Clarke Banister, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 746 days.

(21) Appl. No.: 12/848,969

(22) Filed: Aug. 2, 2010

(65) Prior Publication Data

US 2011/0205954 A1 Aug. 25, 2011

Related U.S. Application Data

(60) Provisional application No. 61/231,294, filed on Aug. 4, 2009.

(51) Int. Cl.
*H04J 1/10* (2006.01)
*H04L 5/00* (2006.01)

(52) U.S. Cl.
CPC ............ *H04L 5/0051* (2013.01); *H04L 5/0058* (2013.01); *H04L 5/0007* (2013.01)
USPC ........................................ 370/315

(58) Field of Classification Search
USPC ......... 370/315, 316, 342, 320, 319, 335, 441, 370/277, 336, 329, 281, 297, 395.3, 395, 370/395.41
See application file for complete search history.

(56) References Cited

U.S. PATENT DOCUMENTS 5,901,185 A * 5/1999 Hassan .................... 375/346
7,623,443 B2 * 11/2009 Johnston .................. 370/208
(Continued)

FOREIGN PATENT DOCUMENTS

CN 101326754 A 12/2008
RU 2313909 C2 12/2007
(Continued)

OTHER PUBLICATIONS

Catt et al., "UE-specific RS for Dual-layer BF", 3GPP Draft, R1-092770, 3rd Generation Partnership Project (3GPP), Mobile Competence Centre, 650, Route Des Lucioles, F-06921 Sophia-Antipolis Cedex, France, No. Los Angeles, USA, 20090624, Jun. 24, 2009, XP050351226.

(Continued)

*Primary Examiner* — Chi Pham
*Assistant Examiner* — Alexander O Boakye
(74) *Attorney, Agent, or Firm* — Anthony R. Morris

(57) ABSTRACT

Systems and methodologies are described that facilitate sending and/or receiving user equipment specific reference signals (UE-RSs) in a wireless communication environment. A UE-RS pattern can be selected, yielded, etc. based upon a number of symbols from a subframe utilized for downlink transmission. At least one time domain component of the UE-RS pattern can vary based upon the number of symbols from the subframe utilized for the downlink transmission. For instance, the at least one time domain component can be punctured, time-shifted, and so forth. Further, UE-RSs can be mapped to resource elements of the subframe as a function of the UE-RS pattern. Moreover, a UE can utilize the UE-RS pattern to detect UE-RSs on the resource elements of the subframe. Further, the UE can estimate a channel based upon the UE-RSs.

50 Claims, 16 Drawing Sheets

(56) References Cited

U.S. PATENT DOCUMENTS

| | | | | |
|---|---|---|---|---|
| 8,036,190 | B2* | 10/2011 | Hsiao et al. | 370/338 |
| 8,072,929 | B2* | 12/2011 | Frederiksen et al. | 370/329 |
| 8,310,961 | B2* | 11/2012 | Chindapol et al. | 370/277 |
| 2008/0260062 | A1 | 10/2008 | Imamura | |

FOREIGN PATENT DOCUMENTS

| | | |
|---|---|---|
| WO | 2008057899 A2 | 5/2008 |
| WO | 2009047709 A2 | 4/2009 |

OTHER PUBLICATIONS

Ericsson, "Usage of DwPTS", 3GPP Draft, R1-080347, 3rd Generation Partnership Project (3GPP), Mobile Competence Centre, 650, Route Des Lucioles, F-06921 Sophia-Antipolis Cedex, France, vol. RAN WGI, No. Sevilla, Spain, 20080109, Jan. 9, 2008, XP050108866.

International Search Report and Written Opinion—PCT/US2010/044466, International Search Authority—European Patent Office—Mar. 17, 2011.

Nokia et al., "Use of Special Sub-frame for backhaul link in TDD relay", 3GPP Draft, R1-092568 Use of Special Sub-Frame for Backhaul Link in TDD Relay, 3rd Generation Partnership Project (3GPP), Mobile Competence Centre, 650, Route Deslucioles, F-06921 Sophia-Antipolis Cedex, France, No. Los Angeles, USA, 20090624, Jun. 24, 2009, XP050351069.

Nortel, "Performance evaluation of DRS design for multi-layer transmission", 3GPP Draft, R1-090754(Nortel-Multiple Layer DRS), 3rd Generation Partnership Project (3GPP), Mobile Competence Centre, 650, Route Des Lucioles, F-06921 Sophia-Antipolis Cedex, France, No. Athens, Greece, 20090205, Feb. 5, 2009, XP050318617.

Nortel, "Performance evaluation of multiple stream DRS design", 3GPP Draft, R1-091385 (N0rtel-4 Layer DRS), 3rd Generation Partnership Project (3GPP), Mobile Competence Centre, 650, Route Des Lucioles, F-06921 Sophia-Antipolis Cedex, France, No. Seoul, Korea, 20090317, Mar. 17, 2009, XP050338974.

Ericsson, "DM RS design for Dual Layer Beamforming", 3GPP TSG-RQN WG1#57, R1-092017, San Francisco, USA, May 4-8, 2009.

LG Electronics: "Consideration on DM-RS Design for LTE-Advanced", 3GPP TSG-RAN WG1#57, R1-092109, San Francisco, USA, May, 4-8, 2009.

LG Electronics: "Consideration on MU-MIMO for LTE-Advanced", 3GPP TSG-RAN WG1#57b, R1-092517, Los Angeles, USA, Jun. 29-Jul. 3, 2009.

NEC Group: "Downlink Demodulation RS design for LTE-A", 3GPPTSG-RAN WG1#56b, R1-091222, Seoul, South Korea, Mar. 23-27, 2009.

Taiwan Search Report—TW099125957—TIPO—May 8, 2013.

TD Tech, "RS Configuration in DwPTS", R1-080781, 3GPP TSG RAN WG1 #52, Sorrento, Italy, Feb. 11-15, 2008.

Qualcomm Europe: "On SRS Periodicity and Offset Configurations", May 4-8, 2009, 3GPP Draft; R1-092039 SRS Periodicity and Offset Configurations, 3rd Generation Partnership Project (3GPP), Mobile Competence Centre ; 650, Route Des Lucioles ; F-06921 Sophia-Antipolis Cedex ; France , XP050339507, pp. 1-2.

Nokia., et al., "On the conflict between UE specific RS with P/S-SCH and P-BCH", 3GPP TSG RAN WG1 Meeting #52bis, ShenZhen, China, Mar. 21-Apr. 4, 2008, R1-081443, 4 pp.

NEC Group: "Control Structure for Relay Type 1 nodes", 3GPP Draft; R1-092965 Control Structure for Relay Type 1 Nodes-Updated, 3rd Generation Partnership Project (3GPP), Mobile Competence Centre ; 650, Route Des Lucioles ; F-06921 Sophia-Antipolis Cedex ; France Jun. 29, 2009, XP002601697 [retrieved on Sep. 21, 2010] p. 2, 1ine 15-1ine 27 p. 3, line 9-line 28 p. 2, figure 2.

* cited by examiner

EXTENSION OF UE-RS TO DWPTS

CROSS-REFERENCE TO RELATED APPLICATIONS

This application claims the benefit of U.S. Provisional Patent Application Ser. No. 61/231,294 entitled "EXTENSION OF UE-RS TO DWPTS IN LTE" which was filed Aug. 4, 2009. The entirety of the aforementioned application is incorporated herein by reference.

BACKGROUND

I. Field

The following description relates generally to wireless communications, and more particularly to employing a UE specific reference signal (UE-RS) design that is a function of a number of symbols utilized for a downlink transmission in a wireless communication system.

II. Background

Wireless communication systems are widely deployed to provide various types of communication content such as, for example, voice, data, and so on. Typical wireless communication systems can be multiple-access systems capable of supporting communication with multiple users by sharing available system resources (e.g., bandwidth, transmit power, . . . ). Examples of such multiple-access systems can include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), multi-carrier wireless specifications such as evolution data optimized (EV-DO), one or more revisions thereof, etc.

Generally, wireless multiple-access communication systems can simultaneously support communication for multiple user equipments (UEs). Each UE can communicate with one or more base stations via transmissions on forward and reverse links. The forward link (or downlink) refers to the communication link from base stations to UEs, and the reverse link (or uplink) refers to the communication link from UEs to base stations. Further, communications between UEs and base stations can be established via single-input single-output (SISO) systems, multiple-input single-output (MISO), multiple-input multiple-output (MIMO) systems, and so forth. In addition, UEs can communicate with other UEs (and/or base stations with other base stations) in peer-to-peer wireless network configurations.

To facilitate coherent demodulation and decoding of a transmission sent via a wireless channel, channel estimation can be employed. In an example, a channel response can be estimated by embedding a known reference signal in the transmission. The reference signal can be analyzed by a receiver to facilitate estimating the channel response, which can approximate alterations to transmitted symbols due to channel conditions. The approximate alterations can assist a receiver during symbol identification, demodulation, and decoding.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating sending and/or receiving user equipment specific reference signals (UE-RSs) in a wireless communication environment. A UE-RS pattern can be selected, yielded, etc. based upon a number of symbols from a subframe utilized for downlink transmission. At least one time domain component of the UE-RS pattern can vary based upon the number of symbols from the subframe utilized for the downlink transmission. For instance, the at least one time domain component can be punctured, time-shifted, and so forth. Further, UE-RSs can be mapped to resource elements of the subframe as a function of the UE-RS pattern. Moreover, a UE can utilize the UE-RS pattern to detect UE-RSs on the resource elements of the subframe. Further, the UE can estimate a channel based upon the UE-RSs.

According to related aspects, a method that facilitates sending reference signals for channel estimation in a wireless communication environment is described herein. The method can include identifying a number of symbols from a subframe utilized for downlink transmission. Further, the method can include selecting a user equipment specific reference signal (UE-RS) pattern based upon the number of symbols from the subframe utilized for the downlink transmission, wherein at least one time domain component of the UE-RS pattern varies based upon the number of symbols from the subframe utilized for the downlink transmission. Moreover, the method can include mapping UE-RSs to resource elements of the subframe as a function of the UE-RS pattern.

Another aspect relates to a wireless communications apparatus. The wireless communications apparatus can include a memory that retains instructions related to identifying a number of symbols from a subframe utilized for downlink transmission, selecting a user equipment specific reference signal (UE-RS) pattern based upon the number of symbols from the subframe utilized for the downlink transmission, wherein at least one time domain component of the UE-RS pattern varies based upon the number of symbols from the subframe utilized for the downlink transmission, and mapping UE-RSs to resource elements of the subframe as a function of the UE-RS pattern. Further, the wireless communications apparatus can include a processor, coupled to the memory, configured to execute the instructions retained in the memory.

Yet another aspect relates to a wireless communications apparatus that enables sending reference signals in a wireless communication environment. The wireless communications apparatus can include means for identifying a number of symbols from a subframe utilized for downlink transmission. Moreover, the wireless communications apparatus can include means for selecting a user equipment specific reference signal (UE-RS) pattern based upon the number of symbols from the subframe utilized for the downlink transmission, wherein at least one time domain component of the UE-RS pattern varies based upon the number of symbols from the subframe utilized for the downlink transmission. Further, the wireless communications apparatus can include means for mapping UE-RSs to resource elements of the subframe as a function of the UE-RS pattern.

Still another aspect relates to a computer program product that can comprise a computer-readable medium. The computer-readable medium can include code for identifying a number of symbols from a subframe utilized for downlink transmission. Further, the computer-readable medium can include code for selecting a user equipment specific reference signal (UE-RS) pattern based upon the number of symbols from the subframe utilized for the downlink transmission, wherein at least one time domain component of the UE-RS pattern varies based upon the number of symbols from the subframe utilized for the downlink transmission. Moreover, the computer-readable medium can include code for mapping UE-RSs to resource elements of the subframe as a function of the UE-RS pattern.

In accordance with another aspect, a wireless communications apparatus can include a processor, wherein the processor can be configured to identify a number of symbols from a subframe utilized for downlink transmission. Moreover, the processor can be configured to select a user equipment specific reference signal (UE-RS) pattern based upon the number of symbols from the subframe utilized for the downlink transmission, wherein at least one time domain component of the UE-RS pattern varies based upon the number of symbols from the subframe utilized for the downlink transmission. Further, the processor can be configured to map UE-RSs to resource elements of the subframe as a function of the UE-RS pattern.

According to other aspects, a method that facilitates estimating a channel in a wireless communication environment is described herein. The method can include identifying a number of symbols from a subframe assigned for downlink transmission. Moreover, the method can include recognizing a user equipment specific reference signal (UE-RS) pattern based upon the number of symbols from the subframe assigned for the downlink transmission, wherein at least one time domain component of the UE-RS pattern varies based upon the number of symbols from the subframe assigned for the downlink transmission. Further, the method can include detecting UE-RSs on resource elements of the subframe specified by the UE-RS pattern. The method can also include estimating a channel based upon the UE-RSs.

Another aspect relates to a wireless communications apparatus. The wireless communications apparatus can include a memory that retains instructions related to identifying a number of symbols from a subframe assigned for downlink transmission, recognizing a user equipment specific reference signal (UE-RS) pattern based upon the number of symbols from the subframe assigned for the downlink transmission, wherein at least one time domain component of the UE-RS pattern varies based upon the number of symbols from the subframe assigned for the downlink transmission, detecting UE-RSs on resource elements of the subframe specified by the UE-RS pattern, and estimating a channel based upon the UE-RSs. Further, the wireless communications apparatus can include a processor, coupled to the memory, configured to execute the instructions retained in the memory.

Yet another aspect relates to a wireless communications apparatus that enables estimating a channel in a wireless communication environment. The wireless communications apparatus can include means for identifying a number of symbols from a subframe assigned for downlink transmission. The wireless communications apparatus can also include means for recognizing a user equipment specific reference signal (UE-RS) pattern based upon the number of symbols from the subframe assigned for the downlink transmission, wherein at least one time domain component of the UE-RS pattern varies based upon the number of symbols from the subframe assigned for the downlink transmission. Further, the wireless communications apparatus can include means for detecting UE-RSs on resource elements of the subframe specified by the UE-RS pattern. Moreover, the wireless communications apparatus can include means for estimating a channel based upon the UE-RSs.

Still another aspect relates to a computer program product that can comprise a computer-readable medium. The computer-readable medium can include code for identifying a number of symbols from a subframe assigned for downlink transmission. Further, the computer-readable medium can include code for recognizing a user equipment specific reference signal (UE-RS) pattern based upon the number of symbols from the subframe assigned for the downlink transmission, wherein at least one time domain component of the UE-RS pattern varies based upon the number of symbols from the subframe assigned for the downlink transmission. Moreover, the computer-readable medium can include code for detecting UE-RSs on resource elements of the subframe specified by the UE-RS pattern. The computer-readable medium can also include code for estimating a channel based upon the UE-RSs.

In accordance with another aspect, a wireless communications apparatus can include a processor, wherein the processor can be configured to identify a number of symbols from a subframe assigned for downlink transmission. Moreover, the processor can be configured to recognize a user equipment specific reference signal (UE-RS) pattern based upon the number of symbols from the subframe assigned for the downlink transmission, wherein at least one time domain component of the UE-RS pattern varies based upon the number of symbols from the subframe assigned for the downlink transmission. Further, the processor can be configured to detect UE-RSs on resource elements of the subframe specified by the UE-RS pattern. The processor can also be configured to estimate a channel based upon the UE-RSs.

Toward the accomplishment of the foregoing and related ends, the one or more embodiments comprise the features hereinafter fully described and particularly pointed out in the claims. The following description and the annexed drawings set forth herein detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
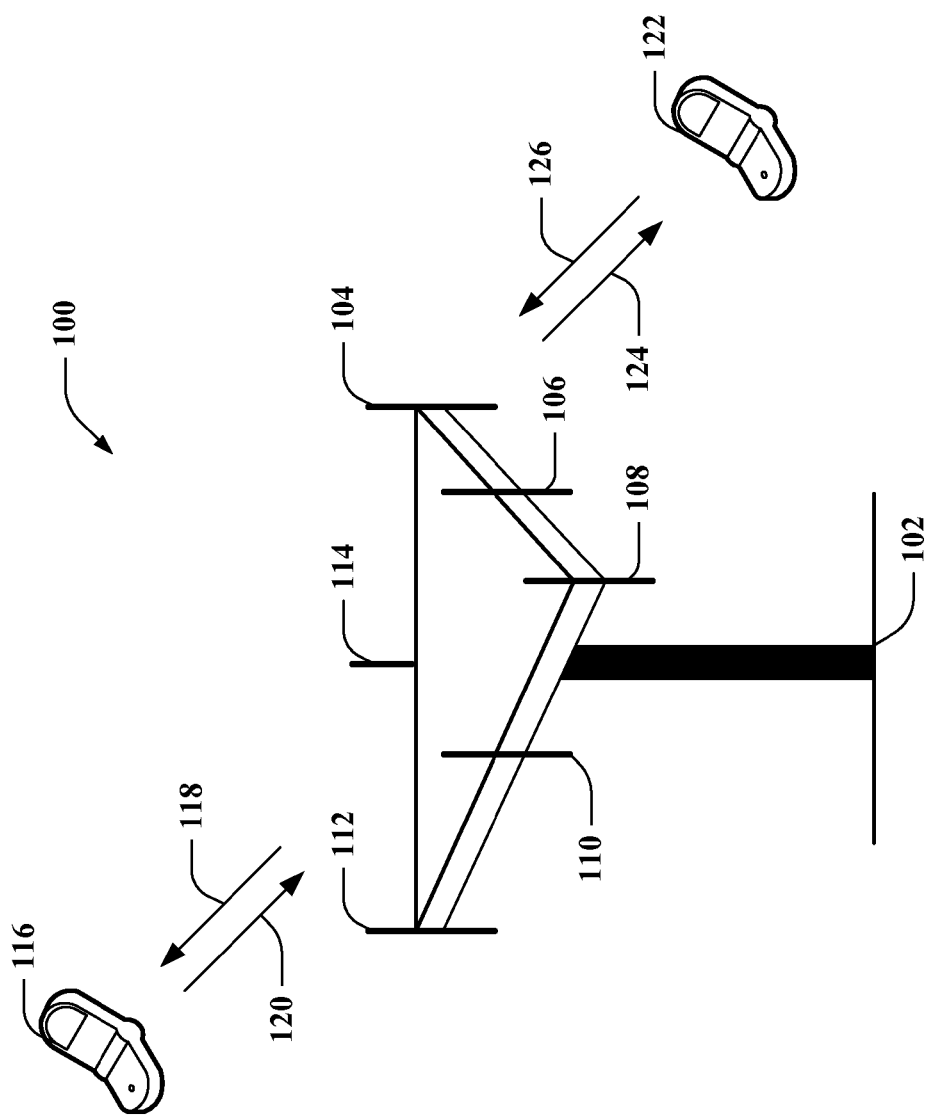
FIG. 1 is an illustration of a wireless communication system in accordance with various aspects set forth herein.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspects(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Various techniques described herein can be used for various wireless communication systems, such as code division multiple access (CDMA) systems, time division multiple access (TDMA) systems, frequency division multiple access (FDMA) systems, orthogonal frequency division multiple access (OFDMA) systems, single carrier-frequency division multiple access (SC-FDMA) systems, and other such systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95, and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits UEs in terms of transmit power efficiency. Accordingly, SC-FDMA can be implemented as an uplink multiple access scheme in 3GPP Long Term Evolution (LTE) or Evolved UTRA.

Furthermore, various aspects are described herein in connection with a user equipment (UE). A UE can refer to a device providing voice and/or data connectivity. A UE can be connected to a computing device such as a laptop computer or desktop computer, or it can be a self-contained device such as a personal digital assistant (PDA). A UE can also be called a system, subscriber unit, subscriber station, mobile station, mobile, remote station, remote terminal, mobile device, user terminal, terminal, wireless communication device, user agent, user device, or access terminal. A UE can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various aspects are described herein in connection with a base station. A base station can be utilized for communicating with UE(s) and can also be referred to as an access point, Node B, Evolved Node B (eNodeB, eNB) or some other terminology. A base station can refer to a device in an access network that communicates over the air interface, through one or more sectors, with UEs. The base station can act as a router between the wireless terminal and the rest of the access network, which can include an Internet Protocol (IP) network, by converting received air interface frames to IP packets. The base station can also coordinate management of attributes for the air interface.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various aspects will be presented in terms of systems that can include a number of devices, components, modules, and the like. It is to be understood and appreciated that the various systems can include additional devices, components, modules, etc. and/or one or more of the devices, components, modules etc. discussed in connection with the figures need not be included. A combination of these approaches can also be used.

Referring now to FIG. 1, a system 100 is illustrated in accordance with various aspects presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more user equipments (UEs) such as UE 116 and UE 122; however, it is to be appreciated that base station 102 can communicate with substantially any number of UEs similar to UE 116 and UE 122. UE 116 and UE 122 can be, for example, cellular phones, smart phones, laptops, handheld communication devices, handheld computing devices, satellite radios, global positioning systems, PDAs, and/or any other suitable device for communicating over system 100. As depicted, UE 116 is in communication with antennas 112 and 114, where antennas 112 and 114 transmit information to UE 116 over a forward link 118 and receive information from UE 116 over a reverse link 120. Moreover, UE 122 is in communication with antennas 104 and 106, where antennas 104 and 106 transmit information to UE 122 over a forward link 124 and receive information from UE 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to UEs in a sector of the areas covered by base station 102. In communication over forward links 118 and 124, the transmitting antennas of base station 102 can utilize beamforming to improve signal-to-noise ratio of forward links 118 and 124 for UE 116 and UE 122. Also, while base station 102 utilizes beamforming to transmit to UE 116 and UE 122 scattered randomly through an associated coverage, UEs in neighboring cells can be subject to less interference as compared to a base station transmitting through a single antenna to all its UEs.

System 100 can employ UE specific reference signals (UE-RSs) to facilitate downlink channel estimation. More particularly, base station 102 can identify a number of symbols from a subframe utilized for downlink transmission. The number of symbols from the subframe utilized for downlink transmission can vary depending upon whether the subframe is a regular subframe (e.g., all symbols of the subframe are used for downlink transmission, . . . ), the subframe includes a Downlink Pilot Timeslot (DwPTS), the subframe is employed in connection with downlink transmission to a relay with one or more symbols in the subframe reserved as gap symbols, or the like. For example, if the subframe includes a DwPTS, then the subframe can be a mixed subframe from a radio frame having a frame structure type 2 for TDD. Following this example, one or more symbols from the mixed subframe can be allocated for a guard period or an Uplink Pilot Timeslot (UpPTS); accordingly, these one or more symbols from the mixed subframe are not used for DwPTS, and thus, are not used for downlink transmission. Further, base station 102 can map UE-RSs to resource elements (REs) of the subframe as a function of a UE-RS pattern corresponding to the number of symbols from the subframe utilized for downlink transmission.

For instance, for a regular subframe, base station 102 can map UE-RSs to REs in the subframe based upon a first UE-RS pattern. Further, when fewer symbols of a subframe are utilized for downlink transmission compared to a regular subframe (e.g., at least one symbol from the subframe is not used for downlink transmission, . . . ), base station 102 can map UE-RSs to REs in the subframe based upon a second UE-RS pattern. The first UE-RS pattern can include multiple frequency domain components and multiple time domain components. At least one of the multiple time domain components from the first UE-RS pattern can be altered in the second UE-RS pattern. For example, one of the multiple time domain components from the first UE-RS pattern can be time-shifted in the second UE-RS pattern. By way of another example, the multiple time domain components from the first UE-RS pattern can be time-shifted in the second UE-RS pattern. Following this example, the multiple time domain components from the first UE-RS pattern can be time-shifted by a common number of symbols or by respective differing numbers of symbols. According to another example, one of the multiple time domain components from the first UE-RS pattern can be punctured in the second UE-RS pattern. Further, the second UE-RS pattern can have the same frequency domain components compared to the first UE-RS pattern.

Figure 2:
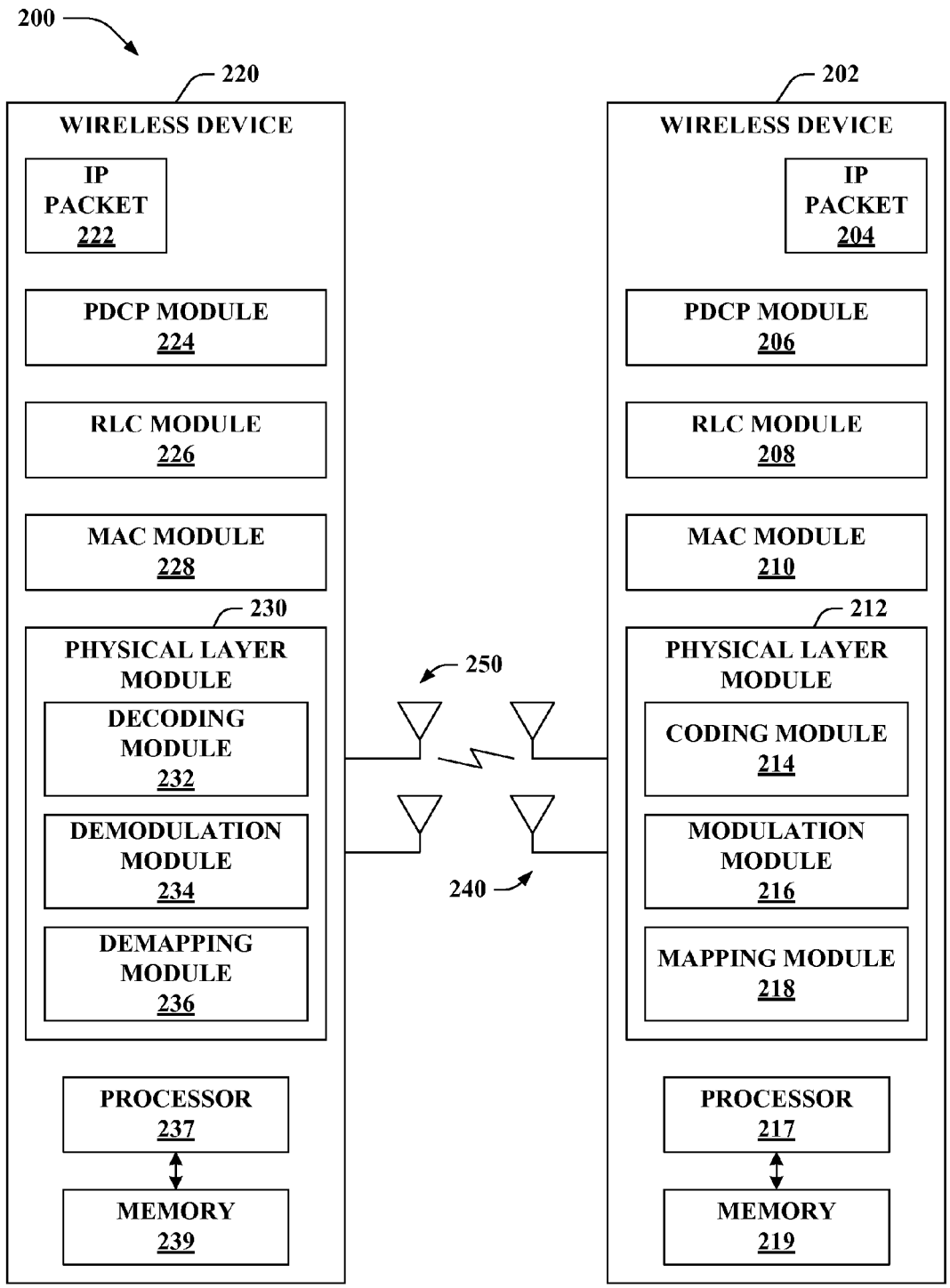
FIG. 2 is an illustration of an example wireless network that employs UE-RSs to facilitate downlink channel estimation in accordance with various aspects.

Now turning to FIG. 2, illustrated is an example wireless network 200 that employs UE-RSs to facilitate downlink channel estimation in accordance with various aspects. Wireless network 200 includes wireless device 202 and wireless device 220 that communication with one another over a wireless network. In one example, wireless device 202 and/or wireless device 220 can be an access point, such as a macrocell access point, femtocell or picocell access point, eNB, mobile base station, a portion thereof, and/or substantially any device or apparatus that provides access to a wireless network. In another example, wireless device 202 and/or wireless device 220 can be a mobile device, such as a UE, a portion thereof, and/or substantially any device or apparatus that receives access to a wireless network.

Wireless device 202 can comprise multiple communication layers to facilitate transmitting/receiving data with wireless device 220. For example, wireless device 202 can include a packet data convergence protocol (PDCP) module 206 that can compress packet headers and facilitate ciphering and integrity protection of data. Wireless device 202 can also include a radio link control (RLC) module 208 that effectuates segmentation/concatenation, retransmission handling, and in-sequence delivery to higher layers, a medium access control (MAC) module 210 that enacts logical channel multiplexing, hybrid automatic repeat request (HARD) retransmissions, scheduling, and a physical layer module 212 that manages coding/decoding, modulation/demodulation, and antenna/resource mapping. Similarly, wireless device 220 can include a PDCP module 224, an RLC module 226, a MAC module 228, and a physical layer module 230 that provide the same or similar functionality.

According to an example, wireless device 202 can transmit an Internet Protocol (IP) packet 204 to wireless device 220 via a wireless channel. The wireless channel can be a downlink channel or an uplink channel. Higher layers (not shown) of wireless device 202 can generate IP packet 204 or otherwise receive IP packet 204 for transmitting to one or more devices. Higher layers can include an application layer, an IP layer, and/or the like. PDCP module 206 can receive IP packet 204 from higher layers and generate one or more PDCP service data units (SDUs). PDCP module 206 can perform IP header compression on IP packet 204. In addition, PDCP module 206 can cipher IP packet 204 and/or provide integrity protection on IP packet 204. PDCP module 206 can further generate a PDCP protocol data unit (PDU) by combining a compressed and ciphered IP packet 204 (e.g., a PDCP SDU) with a PDCP header that includes at least a sequence number related to the PDCP SDU. The PDCP PDU can be provided to RLC module 208, which can segment and concatenate one or more PDCP PDUs into an RLC PDU along with an RLC header. For instance, based upon a resource scheduling decision, a particular amount of data is elected for transmission from an RLC buffer managed by RLC module 208, which segments and concatenates one or more PDCP PDUs to generate the RLC PDU.

RLC module 208 provides the RLC PDU to MAC module 210, which offers MAC layer services (e.g., multiplexing, HARQ retransmissions, scheduling, . . . ) to RLC module 208 in the form of logical channels. A logical channel can be characterized based upon the type of information carried. For instance, logical channels offered by MAC module 210 can include a broadcast control channel (BCCH) which carries system information from a wireless network to mobile devices, a paging control channel (PCCH) utilized for paging mobile devices, a common control channel (CCCH) which carries control information in conjunction with random access, a dedicated control channel (DCCH) which carries control information to and/or from mobile devices, a dedicated traffic channel (DTCH) utilized for user data to and/or from mobile devices, and a multicast control channel (MCCH) utilized carries control information in connection with a multicast traffic channel (MTCH), which carries transmission of multimedia broadcast multicast services.

MAC module 210 can map logical channels to transport channels, which represent services provided by physical layer module 212. Data on a transport channel is organized into transport blocks. For a given transmission time interval (TTI), one or more transport blocks are transmitted over a radio interface. In one example, MAC module 210 multiplexes RLC PDUs into one or more transport blocks.

The transport blocks can be provided to physical layer module 212, which facilitates coding, modulation, multi-antenna processing, and/or mapping of a signal to physical time-frequency resources (e.g., REs, . . . ). According to an example, physical layer module 212 can introduce a cyclic redundancy check (CRC) to a transport block to facilitate error detection. In addition, physical layer module 212 can include a coding module 214 that codes bits of the transport block. In an example, Turbo coding can be employed by the coding module 214. Physical layer module 212 can include a modulation module 216 that modulates the coded bits to generate symbols. Physical layer module 212 can utilize a mapping module 218 to configure antennas to provide different multi-antenna transmission schemes such as transmit diversity, beamforming, and/or spatial multiplexing. In addition, mapping module 218 can map symbols to physical resource elements to enable transmission over the air.

Wireless device 202 can utilize one or more antenna(s) 240 to transmit IP packet 204 to wireless device 220, which can receive the transmission via antenna(s) 250. While FIG. 2 depicts two antennas respectively associated with wireless device 202 and wireless device 220, it is to be appreciated that wireless device 202 and wireless device 220 can include substantially any number of antennas. After reception of IP packet 204 from wireless device 202, wireless device 220 can employ physical layer module 230 to decode and demodulate a transmission. For example, physical layer module 230 can include a demapping module 236 that demaps REs to recover a set of symbols. Physical layer module 230 can also employ a demodulation module 234, which demodulates the set of symbols to recover a set of coded bits. In addition, a decoding module 232 is included in physical layer module 230 to decode the set of coded bits to generate a transport block. The transport block can be provided to MAC module 228 to manage a HARQ retransmission, if necessary, due to errors (e.g., decode errors, transmission errors, . . . ) and to facilitate MAC demultiplexing to generate one or more RLC PDUs. The one or more RLC PDUs can be provided to RLC module 226 for reassembly. For instance, the RLC PDUs can comprise one or more RLC SDUs and/or portions thereof. Accordingly, RLC module 226 reconstructs the RLC SDUs from the RLC PDUs. The reassembled RLC SDUs can be processed by PDCP module 224, which deciphers and decompresses the RLC SDUs to recover one or more data packets such as IP packet 222.

It to be appreciated that wireless device 220 can utilize similar functionality and/or similar modules as wireless device 202 to transmit a data packet to wireless device 202. Further, wireless device 202 can employ similar modules and/or functionality described above with reference to wireless device 220 to receive a transmission from disparate devices, such as wireless device 220.

Pursuant to an example in which wireless device 202 sends IP packet 204 to wireless device 220, wireless device 220 can utilize an estimate of the downlink channel to facilitate coherent demodulation of a downlink physical channel employed to transmit IP packet 204. To enable channel estimation, wireless device 202 can include reference signals in a transmission to wireless device 220. In an example, wireless device 202 incorporates reference signals when the transmission is an OFDM transmission. For instance, wireless device 202 can employ physical layer module 212 and/or mapping module 218 to map reference signals to resource elements within the TTI corresponding to the transmission to wireless device 220. In an aspect, the reference signals can be cell specific reference signals (CRSs), which can be transmitted in many downlink subframes and can span up to an entire bandwidth of the downlink. The reference signals can also be UE-RSs, which are transmitted in subframes and resource blocks intended for a particular receiving device or group of receiving devices.

Again, reference is made to the example in which wireless device 202 transmits to wireless device 220. To enable wireless device 220 to generate a channel estimate for such a transmission, UE-RSs are incorporated and beamformed in a similar manner as the data transmission. In an example, wireless device 202 can utilize physical layer module 212 to generate UE-RSs and mapping module 218 can insert UE-RSs at particular REs in accordance with a UE-RS pattern.

According to an example, a UE-RS pattern can span across a pair of resource blocks (RBs) (e.g., a group of REs, . . . ) included in a subframe. The pair of RBs can be provided as a time-frequency grid having a duration of one subframe (e.g., 1 ms, . . . ) and spanning twelve sub-carriers. A subframe can include two slots, each being six or seven symbols in length, depending on a cyclic prefix employed. In this regard, a pair of RBs can comprise a 12×12 grid or a 12×14 grid of REs. It should be appreciated, however, that other RB definitions can be provided and, further, the UE-RS patterns described below can be utilized with varying RB definitions.

In another aspect, the UE-RS pattern employed for a downlink transmission can be a function of a number of symbols from a subframe utilized for the downlink transmission. According to an example, when a regular subframe is utilized for the downlink transmission, a first UE-RS pattern can be leveraged. Following this example, the first UE-RS pattern can be employed when all symbols of a subframe are used for downlink transmission (e.g., regular subframe, fourteen symbols from the subframe are used for downlink transmission when employing normal cyclic prefix, . . . ). By way of another example, when one or more symbols of a subframe are not used for downlink transmission, a second UE-RS pattern can be leveraged. Pursuant to this example, one or more symbols of the subframe are not used for downlink transmission when the subframe includes DwPTS. Alternatively, one or more symbols of the subframe are not used for downlink transmission when the subframe is employed in connection with downlink transmission to a relay with one or more symbols in the subframe reserved as gap symbols. For instance, when utilizing normal cyclic prefix, the second UE-RS pattern can be leveraged when fewer than fourteen symbols of the subframe are utilized for downlink transmission.

The second UE-RS pattern used for the subframe with at least a subset of symbols not employed for downlink transmission can differ from the first UE-RS pattern used for the regular subframe. For example, the second UE-RS pattern can take into account a number of symbols configured for downlink transmission; however, it is to be appreciated that the claimed subject matter is not so limited. Pursuant to another example, the second UE-RS pattern utilized when at least a subset of symbols from the subframe are not employed for downlink transmission can be based upon the first UE-RS pattern employed for the regular subframe. Following this example, the first UE-RS pattern used for the regular subframe can be time-shifted and/or punctured to obtain the second UE-RS pattern used for the subframe with at least a subset of symbols not employed for downlink transmission.

As further illustrated in system 200, wireless device 202 can include a processor 217 and/or a memory 219, which can be utilized to implement some or all of the functionality of PDCP module 206, RLC module 208, MAC module 210, and physical layer module 212. Similarly, FIG. 2 illustrates that wireless device 220 can also include a processor 237 and/or a memory 239, which can be employed to implement some or all of the functionality of PDCP module 224, RLC module 226, MAC module 228, and physical layer module 230. In an example, memory 219 and/or 239 can retain a computer program product that effectuates utilization of UE-RSs as described herein.

Figure 3:
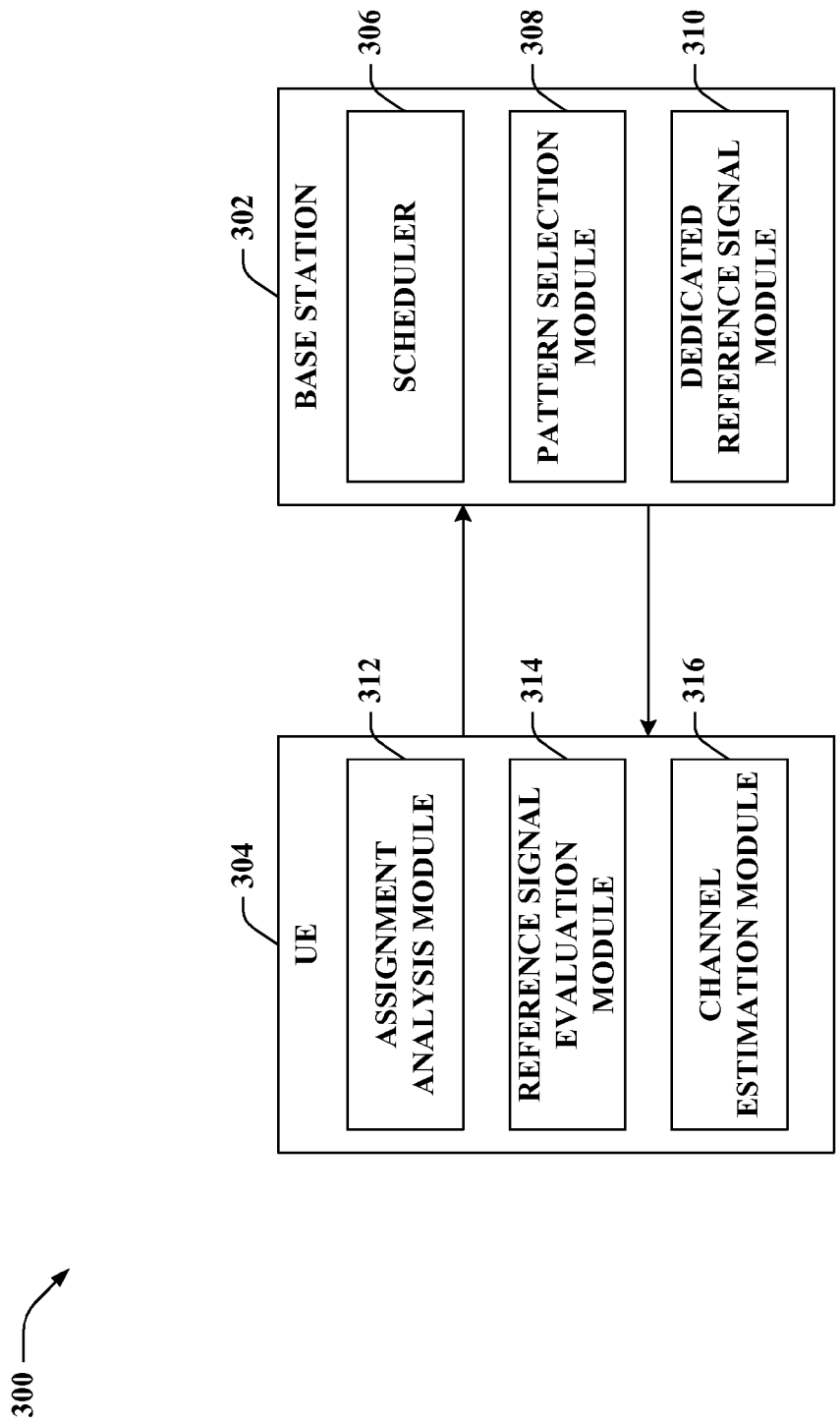
FIG. 3 is an illustration of an example system that maps UE-RSs to REs in a subframe in a wireless communication environment.

Referring next to FIG. 3, illustrated is a system 300 that maps UE-RSs to REs in a subframe in a wireless communication environment. System 300 includes a base station 302 that can communicate with a UE 304. While base station 302 and UE 304 are depicted in FIG. 3, it should be appreciated that system 300 can include any number of base stations and/or UEs. In accordance with an aspect, base station 302 can transmit information to UE 304 over a forward link or downlink channel and UE 304 can transmit information to base station 302 over a reverse link or uplink channel. It should be appreciated that system 300 can operate in an OFDMA wireless network, a CDMA network, a 3GPP LTE or LTE-A wireless network, a 3GPP2 CDMA2000 network, an EV-DO network, a WiMAX network, etc.

Base station 302 can comprise a scheduler 306 that schedules and assigns radio resource to one or more UEs, such as UE 304, to accommodate uplink and downlink transmissions. In an example, scheduler 306 can assign one or more resource blocks to UE 304 for downlink transmission. The one or more resource blocks can be within the same subframe or located within disparate subframes.

Scheduler 306 can assign radio resources from various types of subframes to UE 304 for downlink transmission. For example, scheduler 306 can assign radio resources from a regular subframe to UE 304; thus, radio resources on all symbols from the regular subframe assigned to UE 304 can be used for downlink transmission. According to another example, scheduler 306 can assign radio resources from a subframe that includes DwPTS to UE 304. Following this example, radio resources on a subset of symbols from the subframe that includes DwPTS can be used for downlink transmission, while radio resources on a remainder of the symbols from such subframe are not used for downlink transmission (e.g., instead can be used for guard period or uplink transmission as part of an UpPTS, . . . ).

Although not shown, pursuant to another example, it is also contemplated that system 300 can include a relay. On the downlink, base station 302 can transmit to the relay, and the relay can transmit to UE associated with the relay. Likewise, on the uplink, the UE associated with the relay can transmit to the relay, and the relay can transmit to base station 302. Typically, a relay can be unable to transmit and receive simultaneously (e.g., during a common subframe, . . . ). Thus, if base station 302 sends a packet on the downlink as part of a given subframe, the relay can receive the packet sent by base station 302 (e.g., after a delay, . . . ). Thereafter, the relay can convey the packet to the UE associated with the relay on the downlink as part of a later subframe. Accordingly, the relay can listen for the packet during a first subframe, and then can switch to transmission of the packet during a second subframe. However, switching from listening to transmitting can take time, and thus, a last one or two (or more) symbols from the first subframe can be reserved as gap symbols to support backhaul relay connections. Accordingly, scheduler 306 can assign radio resource from a subframe employed in connection with downlink transmission to the relay with one or more symbols in the subframe reserved as gap symbols; thus, radio resources on a subset of symbols from the subframe can be used for downlink transmission, while radio resources on a remainder of the symbols from the subframe can be reserved as gap symbols.

Further, base station 302 can include a pattern selection module 308 and a dedicated reference signal module 310. Dedicated reference signal module 310 can generate and insert a UE-RS into radio resources from the subframe assigned by scheduler 306 for transmission to UE 304. Dedicated reference signal module 310 can generate a UE-RS and/or map the UE-RS to one or more REs in accordance with a UE-RS pattern chosen by pattern selection module 308.

Pattern selection module 308 can select a UE-RS pattern to be employed by dedicated reference signal module 310. Pattern selection module 308 can choose a UE-RS pattern as a function of a number of symbols from a subframe assigned for downlink transmission by scheduler 306. For example, a UE-RS pattern chosen by pattern selection module 308 for a subframe that includes DwPTS can be different from a UE-RS pattern chosen by pattern selection module 308 for a regular subframe. DwPTS can span only a fraction of a subframe, and downlink transmission can utilize symbols included in the DwPTS. According to another example, pattern selection module 308 can take into account the number of symbols of the subframe configured for DwPTS (e.g., as managed by scheduler 306, . . . ). The following table shows the number of symbols comprising the DwPTS in both normal and extended cyclic prefix (CP) subframes (e.g., for Release 8, . . . ) for differing configurations (conf). It is noted that for DwPTS of 3 symbols there is no Physical Downlink Shared Channel (PDSCH) transmission, and thus, scenarios with larger than 3 symbols for DwPTS can be addressed.

| Conf # | 0 | 1 | 2 | 3 | 4 | 5 | 6 | 7 | 8 |
|---|---|---|---|---|---|---|---|---|---|
| Normal CP | 3 | 9 | 10 | 11 | 12 | 3 | 9 | 10 | 11 |
| Extended CP | 3 | 8 | 9 | 10 | 3 | 8 | 9 | — | — |

According to an illustration, the UE-RS pattern chosen or yielded by pattern selection module 308 for DwPTS can be based on a UE-RS pattern for a regular subframe. Thus, the UE-RS pattern for DwPTS can be obtained by pattern selection module 308 time-shifting and/or puncturing the UE-RS pattern for a regular subframe. For instance, puncturing the UE-RS pattern for the regular subframe can refer to keeping time domain component(s) (e.g., belonging to symbols, . . . ) of the UE-RS pattern for the regular subframe that are part of the DwPTS. Further, timing shifting the UE-RS pattern for the regular subframe can refer to shifting time domain component(s) of the UE-RS pattern for the regular subframe in time by a given value (e.g., number of symbols, . . . ). According to an example, all time domain components of the UE-RS pattern for the regular subframe can be time shifted by a given value. Pursuant to a further example, a subset of the time domain components of the UE-RS pattern for the regular subframe can be time shifted by a given value, while other time domain component(s) of the UE-RS pattern for the regular subframe can be unshifted, shifted by disparate value(s), and so forth. Thus, pattern selection module 308, for instance, can obtain the UE-RS pattern for the subframe that includes DwPTS by time-shifting and/or puncturing the UE-RS pattern for the regular subframe. The simple and regular structure of the above operations effectuated by pattern selection module 308 can be used to simplify implementation of system 300.

Further, a maximum number of control symbols in DwPTS can be two. Thus, pattern selection module 308 can shift the UE-RS pattern for the regular subframe towards edges of the subframe that includes the DwPTS when generating the subframe that includes the DwPTS. Moreover, pattern selection module 308 can shift the UE-RS pattern for the regular subframe depending on a number of control symbols configured. According to another illustration, a fixed UE-RS pattern independent of the number of control symbols configured in the regular subframe can be utilized by pattern selection module 308.

Puncturing and time-shifting operations effectuated by pattern selection module 308 can be applied to a UE-RS pattern for RBs that have possible collisions with different signals and channels such as Primary Synchronization Signal (PSS), Physical Broadcast Channel (PBCH), Secondary Synchronization Signal (SSS), and the like. Moreover, puncturing and time-shifting operations effectuated by pattern selection module 308 can be used to design a UE-RS pattern for backhaul relay connections where it can be desired to reserve one or two (or more) last symbols of a subframe as gap symbols. However, it is to be appreciated that the claimed subject matter is not limited to the foregoing.

Following the example where system 300 includes a relay, the relay can lose the last one or two (or more) symbols from a subframe, where these one or two (or more) symbols can be reserved as gap symbols, when the relay switches from downlink reception from base station 302 to downlink transmission to the UE associated with the relay. Thus, on a normal subframe where both the relay and UE 304 are scheduled by base station 302 (e.g., by scheduler 306, . . . ), pattern selection module 308 can use a first UE-RS pattern (e.g., regular UE-RS pattern, . . . ) for UE 304 and a second UE-RS pattern (e.g., punctured, time-shifted, . . . ) for the relay. Hence, the UE-RS pattern can be chosen by pattern selection module 308 based upon whether the downlink transmission is sent to a UE or a relay.

The radio resources from the subframe, with UE-RSs incorporated, can be transmitted to UE 304. UE 304 can include an assignment analysis module 312 that identifies one or more resource blocks in one or more subframes that are allocated to UE 304. Assignment analysis module 312 can analyze control information included on a control channel, such as a physical downlink control channel (PDCCH), to identify the one or more resource blocks. In addition, assignment analysis module 312 can identify a number of symbols of a subframe utilized for downlink transmission to UE 304.

After reception of the one or more resource blocks, UE 304 can employ a reference signal evaluation module 314 to extract UE-RSs from the one or more resource blocks. In an example, reference signal evaluation module 314 can identify UE-RSs inserted in the one or more resource blocks via knowledge of the UE-RS pattern employed by base station 302. The UE-RSs can be provided to a channel estimation module 316, which generates a channel estimate to facilitate demodulation of data in the one or more resource blocks associated with the UE-RSs.

Referring to FIGS. 4-8, UE-RS patterns that can be utilized in accordance with various aspects set forth herein are illustrated. For the purposes of simplicity of explanation, the UE-RS patterns are shown and described in the context of a pair of resource blocks, where each resource block comprises twelve subcarriers in the frequency domain and one slot with seven symbols in the time domain. It is to be understood and appreciated that the UE-RS patterns are not limited by the constraints of the depicted resource block pairs, as some resource block pairs can, in accordance with one or more embodiments, include different dimensions (e.g., different number of subcarriers and/or different durations (number of symbols)). Moreover, the resource block pairs depicted and described herein are indexed, in the frequency domain, by an index corresponding to each subcarrier. As shown in FIGS. 4-8, subcarriers are indexed from 1 to 12 starting with a top or higher frequency subcarrier. In addition, the resource block pairs are indexed, in the time domain, by an index corresponding to each symbol (e.g., OFDM symbol, . . . ) in a subframe from 1 to 14 starting with the beginning of the subframe. It is to be appreciated that the structures are not limited to the indexing convention illustrated herein, and other conventions can be employed. For example, those skilled in the art will understand and appreciate that the resource block pairs can be represented with other labeling conventions for resource blocks. Further, it is to be appreciated that the structures depicted in FIGS. 4-8 are intended to encompass equivalent structures derived via shifting reference symbol locations in the time domain and/or the frequency domain.

Figure 4:
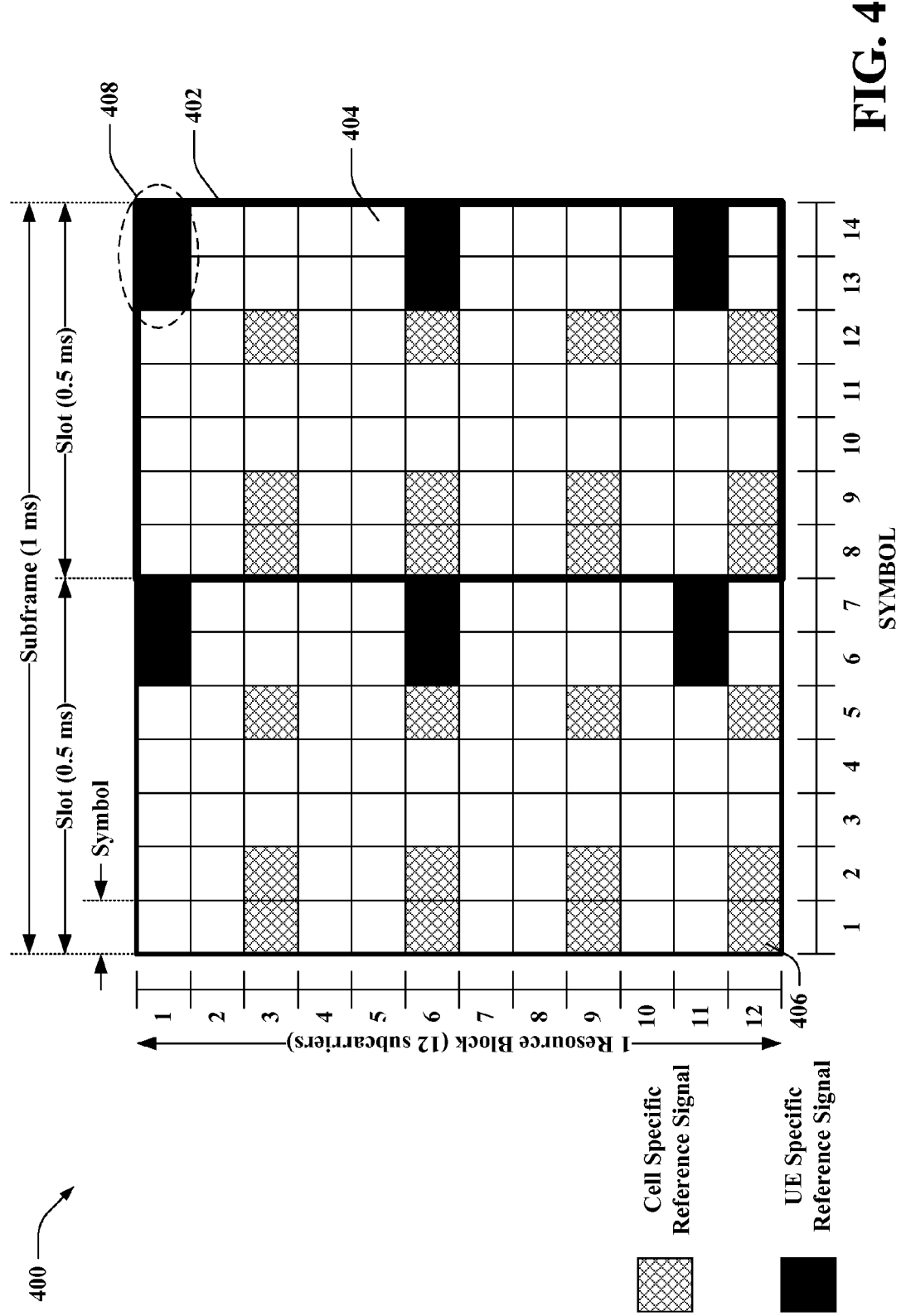
FIG. 4 is an illustration of an example subframe that can be leveraged in a wireless communication environment.

Turning to FIG. 4, illustrated is an example subframe 400 that can be leveraged in a wireless communication environment. Subframe 400 can be used for normal cyclic prefix (CP). It is to be appreciated that subframe 400 is provided as an example, and the claimed subject matter is not so limited.

Subframe 400 can have a duration of 1 ms, and can include two slots (e.g., each having a duration of 0.5 ms, . . . ). In the depicted example, a slot of subframe 400 can include seven symbols in the case of normal CP length; thus, subframe 400 can include fourteen symbols. By way of another example, it is contemplated that a subframe (not shown) that employs extended CP can include two slots, each of which can include six symbols. It is to be appreciated, however, that the claimed subject matter is not limited to the foregoing examples.

In the frequency domain, resources of subframe 400 can be grouped in units of twelve subcarriers (e.g., 180 kHz, . . . ). A unit of twelve subcarriers for a duration of one slot (e.g., 0.5 ms, . . . ) can be referred to as a resource block (RB) (e.g., an example is RB 402, . . . ). Subframe 400 includes a pair of RBs. The smallest unit of resource can be referred to as a resource element (RE), which can be one subcarrier for a duration of one symbol (e.g., an example is RE 404 included in RB 402, . . . ). An RB can include 84 REs for normal CP (or 72 REs for extended CP).

According to an example, subframe 400 can be a regular subframe. Following this example, up to a first three symbols of subframe 400 can be control symbols (e.g., a first one, two, or three symbols of subframe 400 can be control symbols and remaining symbols can be utilized for data, . . . ). Pursuant to another example, subframe 400 can be a subframe that includes DwPTS; hence, up to a first two symbols of subframe 400 can be control symbols. It is to be noted that UE-RSs are sent in a data portion of a subframe.

REs in subframe 400 can carry CRSs and UE-RSs. For example, CRSs (e.g., an example is CRS 406, . . . ) can be mapped to REs on the first, second, fifth, eighth, ninth, and twelfth symbols of subframe 400. It is to be appreciated, however, that the claimed subject matter is not limited to this example, as other mappings of CRSs are intended to fall within the scope of the hereto appended claims.

Moreover, UE-RSs can be mapped to REs according to a UE-RS pattern as set forth herein. A UE-RS pattern can be defined for multiple layers. The multiple layers within a UE-RS pattern can be multiplexed using a combination of code division multiplexing (CDM)/frequency division multiplexing (FDM) and/or time division multiplexing (TDM). For example, a UE-RS pattern can support up to two layers. Accordingly, a UE-RS pattern can include multiple CDM groups, where a CDM group is mapped over two contiguous REs in time (e.g., an example is CDM group 408, . . . ). Hence, pilots of two layers can be orthogonally multiplexed over the two contiguous REs in time. Each layer can be assigned a spreading sequence, and the UE-RS for each layer can be spread using its assigned spreading sequence over a set of REs shared by other layers. Further, the spreading sequence assigned can be chosen to be orthogonal to minimize crosstalk.

FIG. 4 depicts a UE-RS pattern for a regular subframe. The UE-RS pattern for a regular subframe includes frequency domain components and time domain components. A frequency domain component can refer to all CDM groups on the same subcarrier; hence, the illustrated UE-RS pattern for a regular subframe includes three frequency domain components (e.g., three looks in frequency, . . . ). Further, a time domain component can refer to all CDM groups on the same set of symbols. The depicted UE-RS pattern for a regular subframe includes two time domain components (e.g., two looks in time, . . . ), where one time domain component includes three CDM groups on symbols 6 and 7 from subframe 400 and another time domain component includes three CDM groups on symbols 13 and 14 from subframe 400. Accordingly, the UE-RS pattern for a regular subframe can include a total of six CDM groups, which can mitigate an impact due to changes in a channel in frequency and time.

Figure 5:
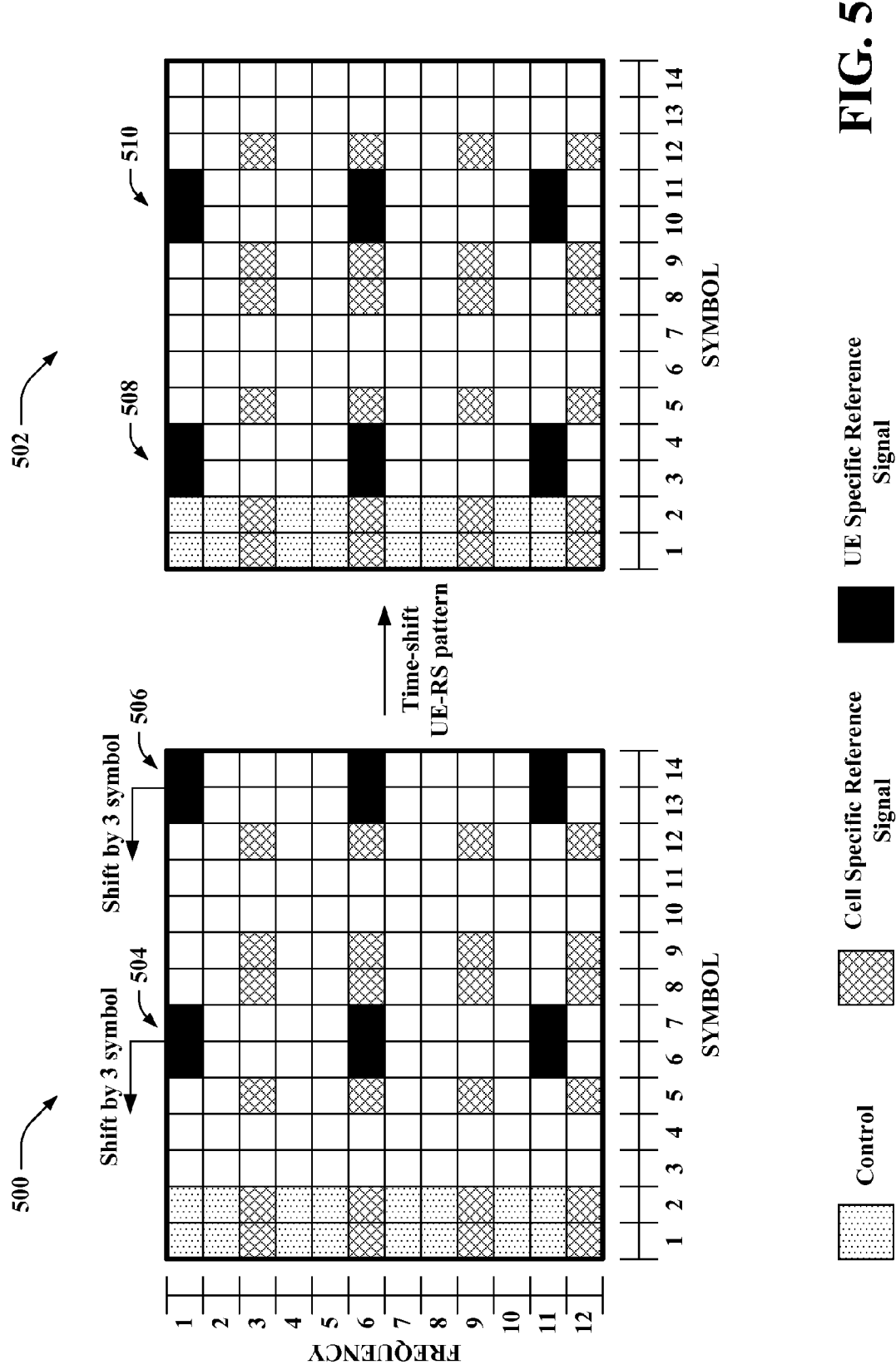
FIG. 5 is an illustration of an example time-shifted UE-RS pattern in accordance with various aspects.

Now referring to FIG. 5, illustrated is an example time-shifted UE-RS pattern in accordance with various aspects. FIG. 5 depicts a UE-RS pattern 500 for a regular subframe and a time-shifted UE-RS pattern 502. Time-shifted UE-RS pattern 502 can be utilized when a subframe includes a DwPTS, for example. Accordingly, a downlink transmission is not sent on a subset of symbols from an end of a subframe, where the number of symbols included in the subset is a function of a DwPTS configuration. Much of the below discussion related to FIGS. 5-8 follow this example where a subset of symbols are not used for downlink transmission due to the subframe including a DwPTS. However, it is to be appreciated that at least a portion of the below can be extended to a subframe employed in connection with downlink transmission to a relay with one or more symbols in the subframe are reserved as gap symbols (e.g., depending upon a number of control symbols, . . . ).

Similar to the UE-RS pattern from FIG. 4, UE-RS pattern 500 includes two time domain components: namely, time domain component 504 and time domain component 506. To yield time-shifted UE-RS pattern 502, time domain component 504 and time domain component 506 can be time-shifted by a common number of symbols. More particularly, time domain component 504 and time domain component 506 can each be shifted by three symbols, resulting in time-shifted UE-RS pattern 502 with time domain component 508 and time domain component 510. Time domain component 508 includes three CDM groups on symbols 3 and 4, and time domain component 510 includes three CDM groups on symbols 10 and 11.

According to an example, time-shifted UE-RS pattern 502 can be used when DwPTS includes eleven or twelve symbols, and thus, a last two or three symbols (e.g., symbols 12-14 or symbols 13-14, . . . ) are not employed for downlink transmission. Moreover, time-shifted UE-RS pattern 502 provides the same pilot spacing as compared to UE-RS pattern 500 since UE-RS pattern 500 is uniformly shifted in time. Time-shifted UE-RS pattern 502 can be leveraged for a subframe that includes DwPTS since a maximum of two control symbols (e.g., a first one or two symbols, . . . ) can be included in a control region as compared to a regular subframe which can include a maximum of three control symbols (e.g., a first one, two, or three symbols, . . . ) in a control region. Further, frequency domain components can remain unchanged between UE-RS pattern 500 and time-shifted UE-RS pattern 502.

Figure 6:
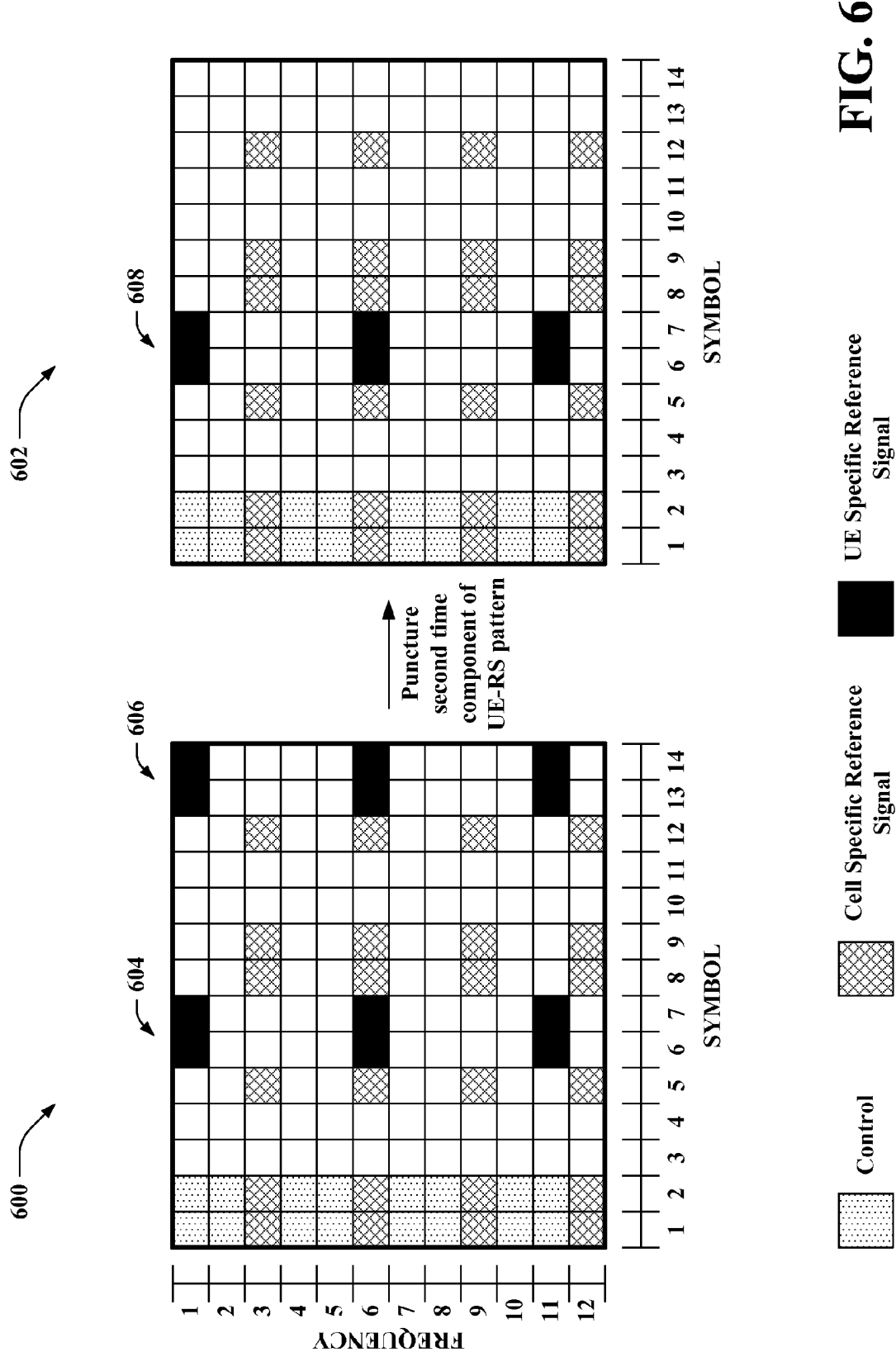
FIG. 6 is an illustration of an example punctured UE-RS pattern in accordance with various aspects.

With reference to FIG. 6, illustrated is an example punctured UE-RS pattern in accordance with various aspects. FIG. 6 depicts a UE-RS pattern 600 for a regular subframe and a punctured UE-RS pattern 602. As described herein, UE-RS pattern 600 includes two time domain components: namely, time domain component 604 and time domain component 606. To yield punctured UE-RS pattern 602, time domain component 606 (e.g., a second time domain component of punctured UE-RS pattern 602, . . . ) can be punctured (e.g., removed, . . . ). Thus, punctured UE-RS pattern 602 can include time domain component 608, which includes three CDM groups on symbols 3 and 4, with no second time domain component. Punctured UE-RS pattern 602 can be used when DwPTS includes nine, ten, eleven or twelve symbols, and thus, a last two, three, four, or five symbols (e.g., symbols 10-14, symbols 11-14, symbols 12-14 or symbols 13-14, . . . ) are not employed for downlink transmission. Further, frequency domain components can remain unchanged between UE-RS pattern 600 and punctured UE-RS pattern 602.

Figure 7:
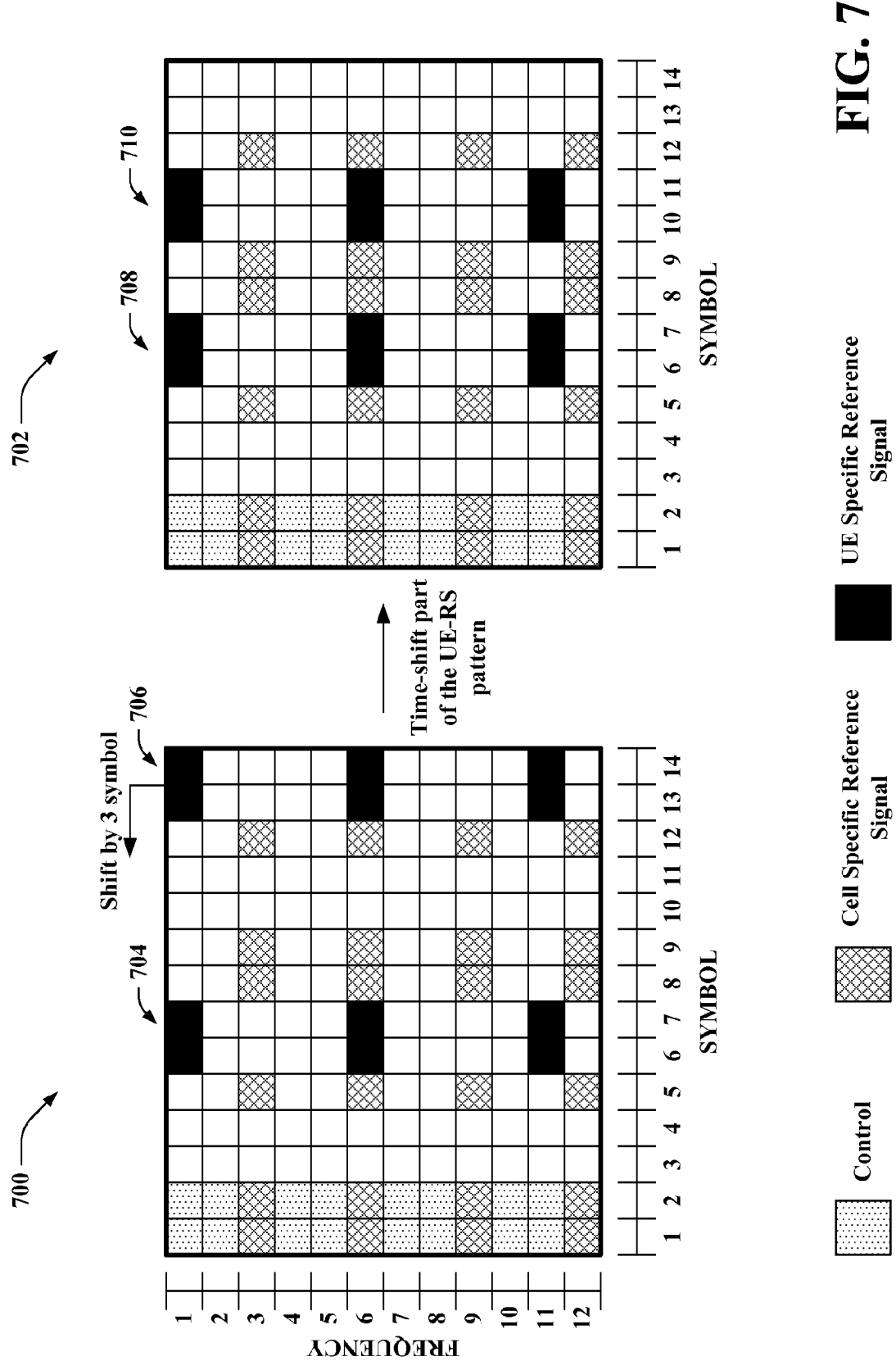
FIG. 7 is an illustration of an example partially time-shifted UE-RS pattern in accordance with various aspects.

Turning to FIG. 7, illustrated is an example partially time-shifted UE-RS pattern in accordance with various aspects. FIG. 7 depicts a UE-RS pattern 700 for a regular subframe and a partially time-shifted UE-RS pattern 702. As described herein, UE-RS pattern 700 includes two time domain components: namely, time domain component 704 and time domain component 706. To yield partially time-shifted UE-RS pattern 702, a part of UE-RS pattern 700 can be time-shifted. In particular, time domain component 706 can be shifted by three symbols, while not shifting time domain component 704. The foregoing can result in partially time-shifted UE-RS pattern 702 with time domain component 708 and time domain component 710. Time domain component 708 includes three CDM groups on symbols 6 and 7, and time domain component 710 includes three CDM groups on symbols 10 and 11. Hence, spacing between time domain component 704 and time domain component 706 in UE-RS pattern 700 can differ from spacing between time domain component 708 and time domain component 710 in partially time-shifted UE-RS pattern 702. Partially time-shifted UE-RS pattern 702 can be used when DwPTS includes eleven or twelve symbols, and thus, a last two or three symbols (e.g., symbols 12-14 or symbols 13-14, . . . ) are not employed for downlink transmission. Further, frequency domain components can remain unchanged between UE-RS pattern 700 and partially time-shifted UE-RS pattern 702.

For instance, partially time-shifted UE-RS pattern 702 can be employed for relays. For a relay, up to the first three symbols can be configured as control symbols. Accordingly, partially time-shifted UE-RS pattern 702 can avoid the first three symbols. Moreover, partially time-shifted UE-RS pattern 702 can avoid a last few (e.g., one or two, . . . ) symbols, which the relay can employ as a gap period.

Figure 8:
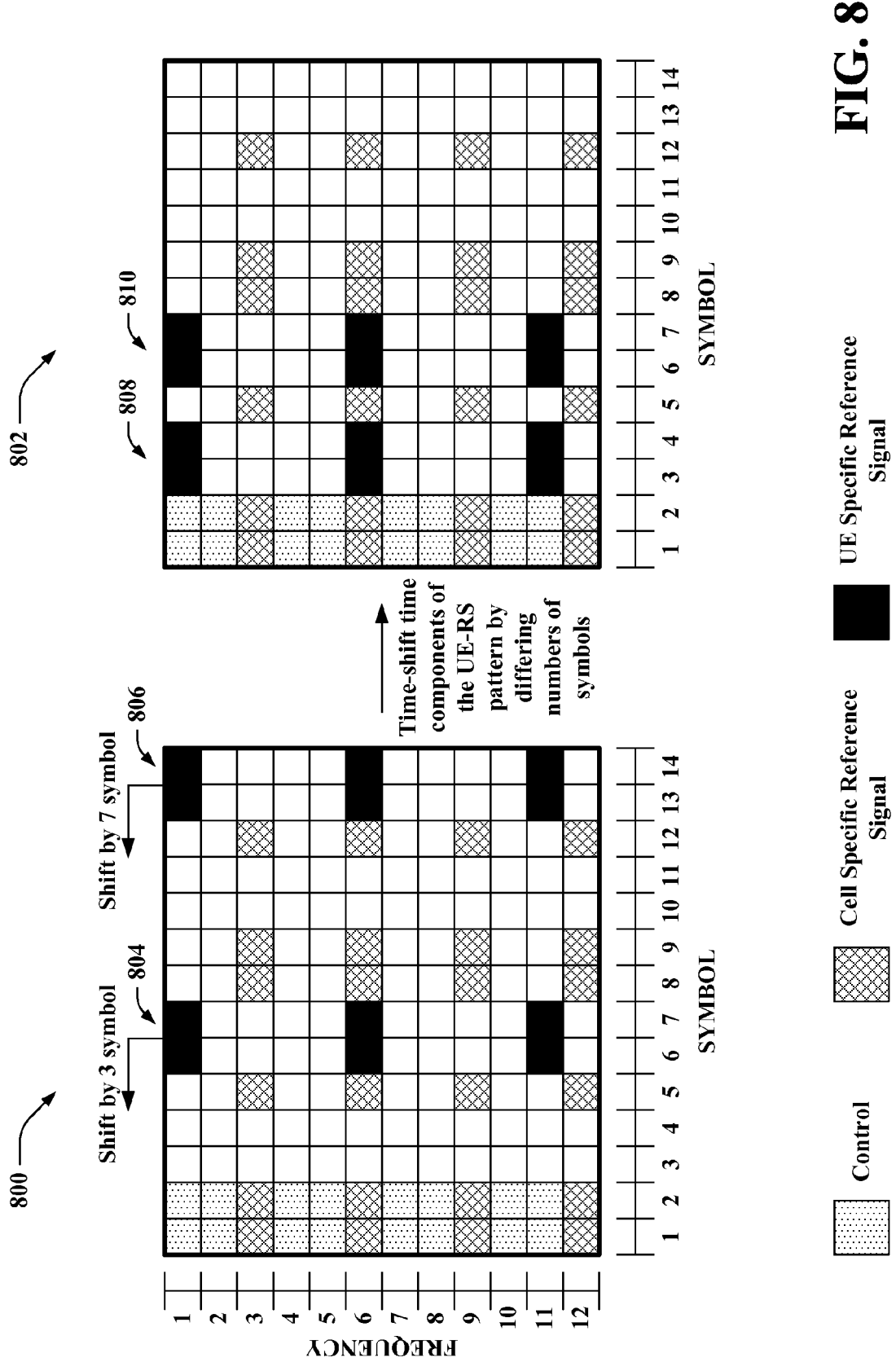
FIG. 8 is an illustration of an example time-shifted UE-RS pattern in accordance with various aspects.

With reference to FIG. 8, illustrated is an example time-shifted UE-RS pattern in accordance with various aspects. FIG. 8 depicts a UE-RS pattern 800 for a regular subframe and a time-shifted UE-RS pattern 802. As described herein, UE-RS pattern 800 includes two time domain components: namely, time domain component 804 and time domain component 806. To yield time-shifted UE-RS pattern 802, time domain component 804 and time domain component 806 can be time-shifted by differing numbers of symbols. For instance, time domain component 804 can be shifted by three symbols and time domain component 806 can be shifted by seven symbols, resulting in time-shifted UE-RS pattern 802 with time domain component 808 and time domain component 810. Time domain component 808 includes three CDM groups on symbols 3 and 4, and time domain component 810 includes three CDM groups on symbols 6 and 7. Accordingly, spacing between time domain component 804 and time domain component 806 in UE-RS pattern 800 can differ from spacing between time domain component 808 and time domain component 810 in time-shifted UE-RS pattern 802. Time-shifted UE-RS pattern 802 can be used when DwPTS includes nine, ten, eleven or twelve symbols, and thus, a last two, three, four, or five symbols (e.g., symbols 10-14, symbols 11-14, symbols 12-14 or symbols 13-14, . . . ) are not employed for downlink transmission. Further, frequency domain components can remain unchanged between UE-RS pattern 800 and time-shifted UE-RS pattern 802.

Figure 9:
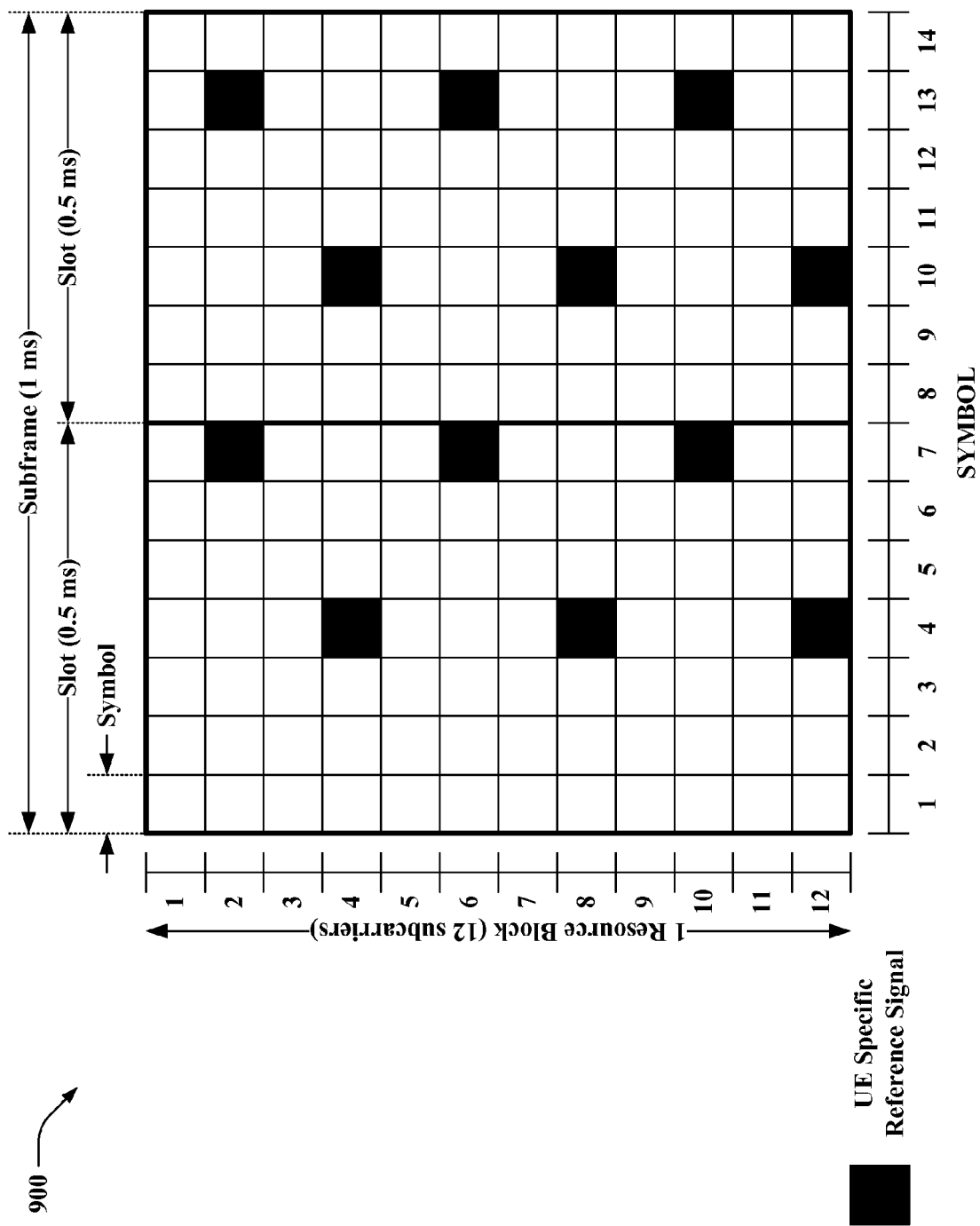
FIG. 9 is an illustration of an example subframe that can be leveraged in a legacy wireless communication environment.

Turning to FIG. 9, illustrated is an example subframe 900 that can be leveraged in a legacy wireless communication environment. Subframe 900 can carry dedicated reference signals (DRSs) that can be mapped to REs according to a legacy DRS pattern. The legacy DRS pattern can be utilized in a Release 8 wireless communication environment, for example.

FIG. 9 is provided to highlight differences between puncturing described herein and puncturing in the context of a legacy DRS pattern. Due to time domain CDM groups being employed in the UE-RS patterns described herein (e.g., the UE-RS pattern set forth in FIGS. 4-8, . . . ), for a subframe with thirteen symbols, the pilots (e.g., UE-RSs, . . . ) on both symbols 13 and 14 can be removed (e.g., punctured, . . . ) although symbol 13 can still be utilized for downlink transmission. Hence, an entire CDM group can be removed when puncturing.

In contrast, the legacy DRS pattern of subframe 900 can be used for a rank one (one layer) transmission. If subframe 900 is a DwPTS subframe, the legacy DRS pattern can be punctured. For example, for a subframe with 10-12 symbols, the first three looks in time can be retained while puncturing the fourth look in time. According to another example, for a subframe with 7-9 symbols, the first two looks in time can be retained while puncturing the second two looks in time. It is to be appreciated, however, that the claimed subject matter is not limited to the example set forth in connection with FIG. 9.

Figure 10:
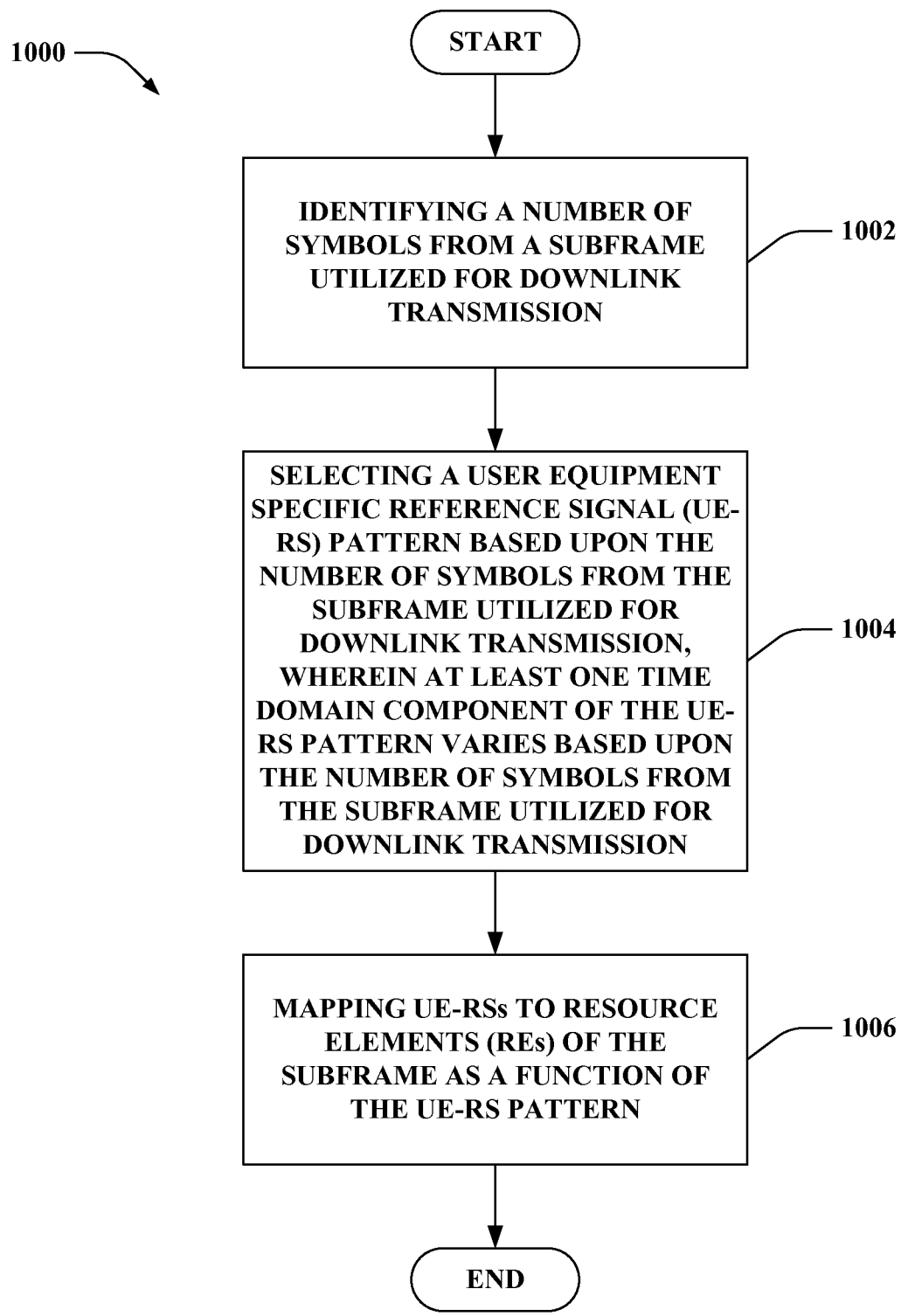
FIG. 10 is an illustration of an example methodology that facilitates sending reference signals for channel estimation in a wireless communication environment.
Figure 11:
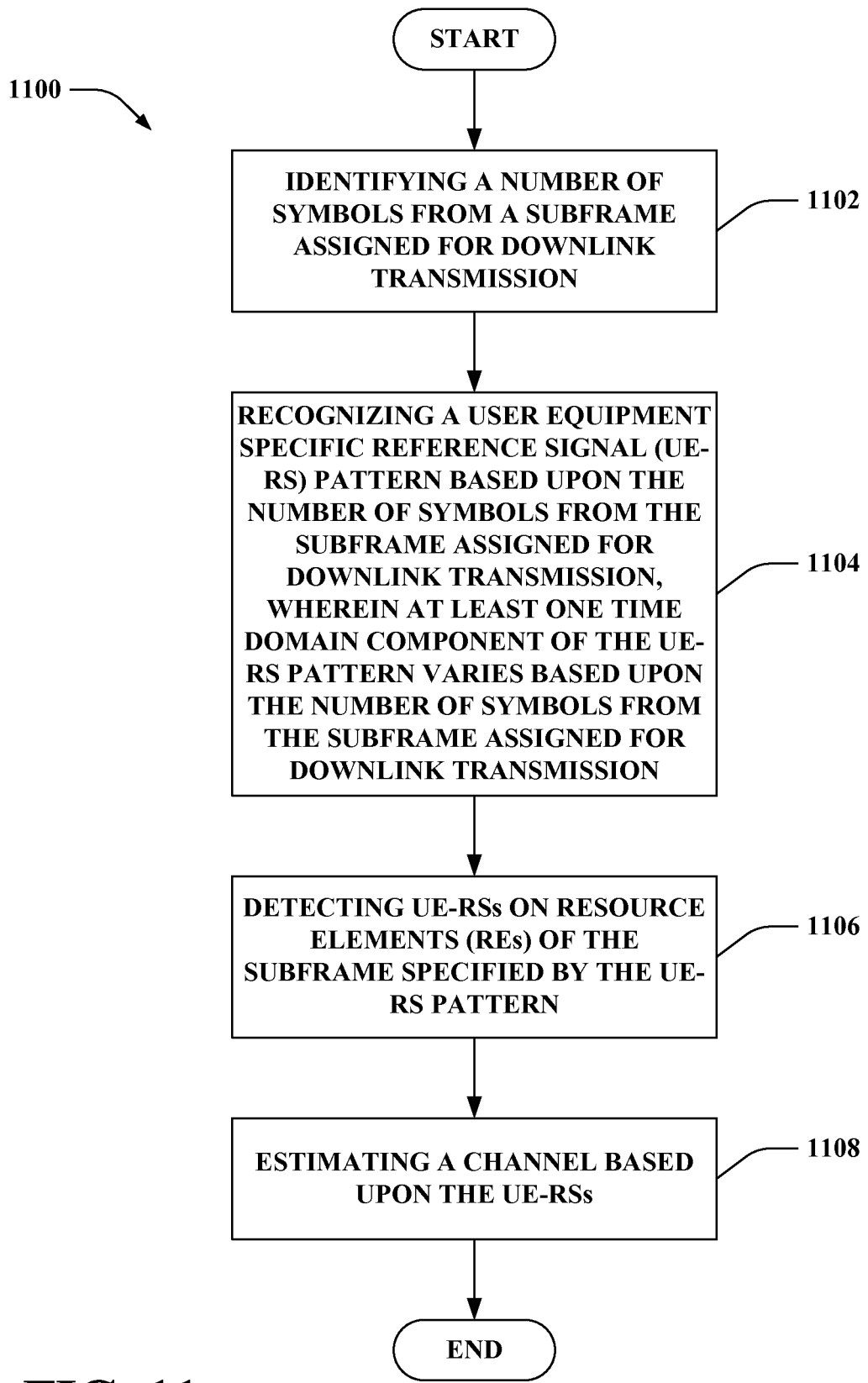
FIG. 11 is an illustration of an example methodology that facilitates estimating a channel in a wireless communication environment.

Referring to FIGS. 10-11, methodologies relating to employing UE-RSs in a wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 10, illustrated is a methodology 1000 that facilitates sending reference signals for channel estimation in a wireless communication environment. At 1002, a number of symbols from a subframe utilized for downlink transmission can be identified. For instance, the number of symbols from the subframe utilized for downlink transmission can be identified from an assignment. By way of example, if the subframe is recognized as being a regular subframe, then all symbols from the subframe can be identified as being utilized for the downlink transmission. Pursuant to another example, if the subframe is recognized as including a Downlink Pilot Timeslot (DwPTS), then the number of symbols utilized for the downlink transmission can be a number of symbols included in the DwPTS as configured. By way of a further example, if the subframe is utilized for sending the downlink transmission to a relay, then one or more symbols in the subframe reserved as gap symbols can be identified.

At 1004, a user equipment specific reference signal (UE-RS) pattern can be selected based upon the number of symbols from the subframe utilized for downlink transmission. For instance, at least one time domain component of the UE-RS pattern can be varied based upon the number of symbols from the subframe utilized for downlink transmission. A time domain component of the UE-RS pattern can include code division multiplexing (CDM) groups on a same set of symbols. Further, frequency domain components of the UE-RS pattern can be unchanged based upon the number of symbols from the subframe utilized for downlink transmission. At 1006, UE-RSs can be mapped to resource elements (REs) of the subframe as a function of the UE-RS pattern.

According to an example, the at least one time domain component of the UE-RS pattern can be varied based upon the number of symbols from the subframe utilized for the downlink transmission by time-shifting the at least one time domain component of the UE-RS pattern. By way of illustration, a set of time domain components of the UE-RS pattern can be time-shifted by a common number of symbols. Pursuant to another illustration, a set of time domain components of the UE-RS pattern can be time-shifted by differing, respective numbers of symbols. By way of yet another example, one time domain component of the UE-RS pattern can be time-shifted, while a disparate time domain component of the UE-RS pattern can be unchanged in time. By way of another example, the at least one time domain component of the UE-RS pattern can be varied based upon the number of symbols from the subframe utilized for the downlink transmission by puncturing one time domain component of the UE-RS pattern. Pursuant to another example, the UE-RS pattern can be selected based upon whether the downlink transmission is sent to a relay or a UE.

Turning to FIG. 11, illustrated is a methodology 1100 that facilitates estimating a channel in a wireless communication environment. At 1102, a number of symbols from a subframe assigned for downlink transmission can be identified. By way of example, if the subframe is recognized as being a regular subframe, then all symbols from the subframe can be identified as being assigned for the downlink transmission. Pursuant to another example, if the subframe is recognized as including a Downlink Pilot Timeslot (DwPTS), then the number of symbols assigned for the downlink transmission can be a number of symbols included in the DwPTS as configured.

At 1104, a user equipment specific reference signal (UE-RS) pattern can be recognized based upon the number of symbols from the subframe assigned for downlink transmission. For instance, at least one time domain component of the UE-RS pattern can be varied based upon the number of symbols from the subframe assigned for downlink transmission. A time domain component of the UE-RS pattern can include code division multiplexing (CDM) groups on a same set of symbols. Further, frequency domain components of the UE-RS pattern can be unchanged based upon the number of symbols from the subframe utilized for downlink transmission. At 1106, UE-RSs on resource elements (REs) of the subframe specified by the UE-RS pattern can be detected. At 1108, a channel can be estimated based upon the UE-RSs.

According to an example, the at least one time domain component of the UE-RS pattern can be varied based upon the number of symbols from the subframe utilized for the downlink transmission by time-shifting the at least one time domain component of the UE-RS pattern. By way of illustration, a set of time domain components of the UE-RS pattern can be time-shifted by a common number of symbols. Pursuant to another illustration, a set of time domain components of the UE-RS pattern can be time-shifted by differing, respective numbers of symbols. By way of yet another example, one time domain component of the UE-RS pattern can be time-shifted, while a disparate time domain component of the UE-RS pattern can be unchanged in time. By way of another example, the at least one time domain component of the UE-RS pattern can be varied based upon the number of symbols from the subframe utilized for the downlink transmission by puncturing one time domain component of the UE-RS pattern.

It will be appreciated that, in accordance with one or more aspects described herein, inferences can be made sending and/or receiving UE-RSs in a wireless communication environment. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 12:
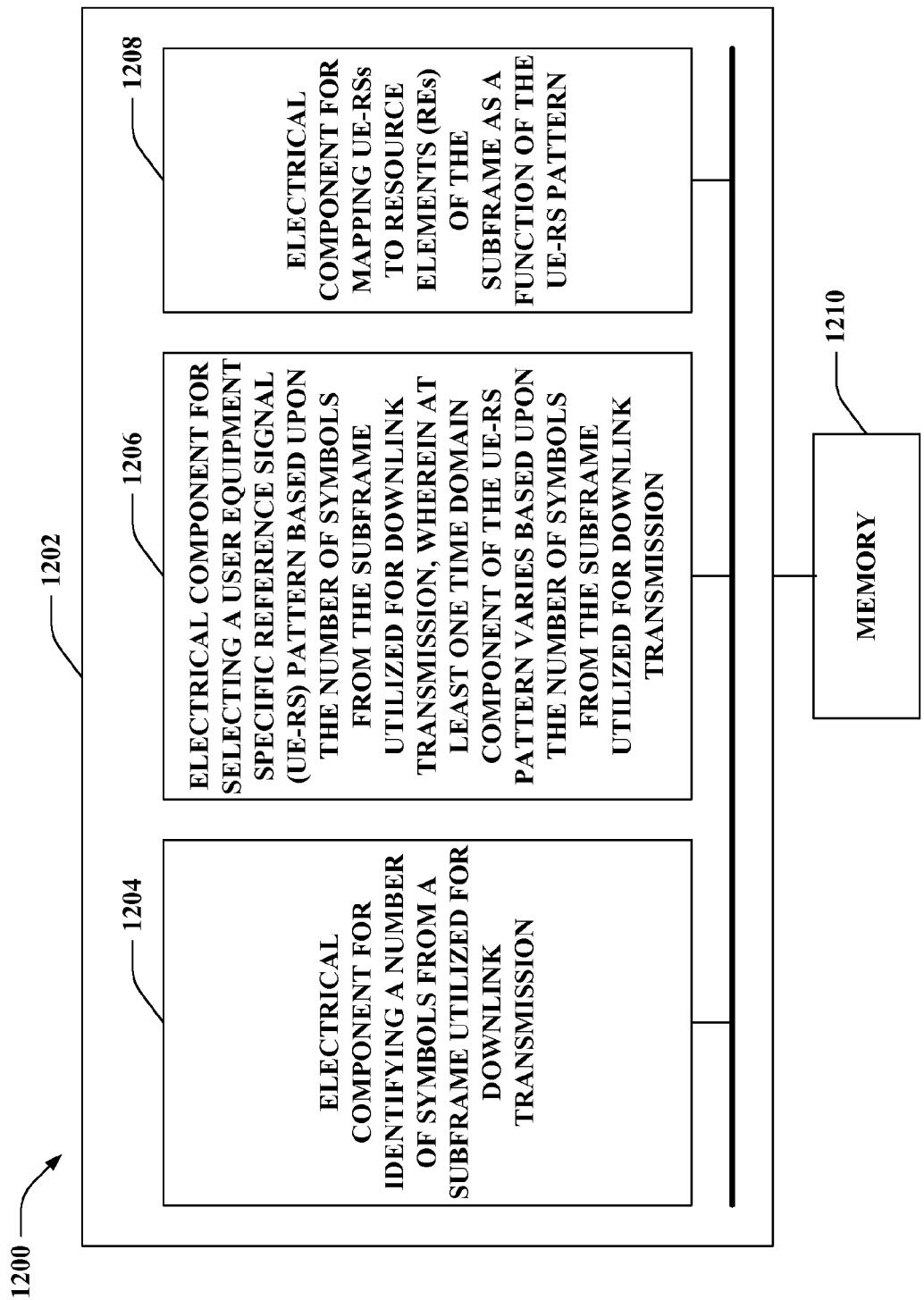
FIG. 12 is an illustration of an example system that enables sending reference signals in a wireless communication environment.

With reference to FIG. 12, illustrated is a system 1200 that enables sending reference signals in a wireless communication environment. For example, system 1200 can reside at least partially within a base station. It is to be appreciated that system 1200 is represented as including functional blocks, which can be functional blocks that represent functions implemented by a processor, software, or combination thereof (e.g., firmware). System 1200 includes a logical grouping 1202 of electrical components that can act in conjunction. For instance, logical grouping 1202 can include an electrical component for identifying a number of symbols from a subframe utilized for downlink transmission 1204. Moreover, logical grouping 1202 can include an electrical component for selecting a user equipment specific reference signal (UE-RS) pattern based upon the number of symbols from the subframe utilized for downlink transmission, wherein at least one time domain component of the UE-RS pattern varies based upon the number of symbols from the subframe utilized for downlink transmission 1206. Further, logical grouping 1202 can include an electrical component for mapping UE-RSs to resource elements (REs) of the subframe as a function of the UE-RS pattern 1208. Additionally, system 1200 can include a memory 1210 that retains instructions for executing functions associated with electrical components 1204, 1206, and 1208. While shown as being external to memory 1210, it is to be understood that one or more of electrical components 1204, 1206, and 1208 can exist within memory 1210.

Figure 13:
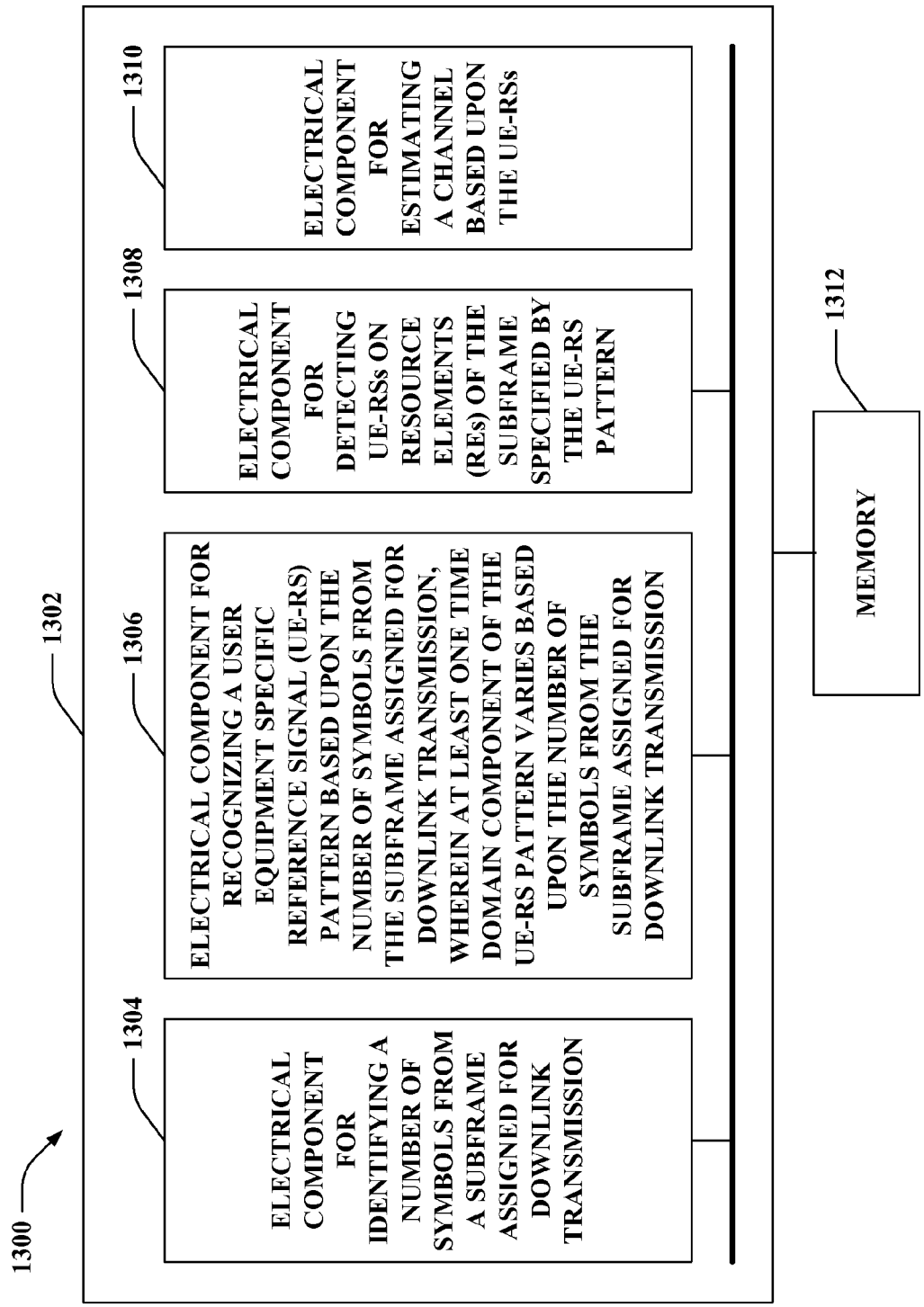
FIG. 13 is an illustration of an example system that enables estimating a channel in a wireless communication environment.

With reference to FIG. 13, illustrated is a system 1300 that enables estimating a channel in a wireless communication environment. For example, system 1300 can reside within a UE. It is to be appreciated that system 1300 is represented as including functional blocks, which can be functional blocks that represent functions implemented by a processor, software, or combination thereof (e.g., firmware). System 1300 includes a logical grouping 1302 of electrical components that can act in conjunction. For instance, logical grouping 1302 can include an electrical component for identifying a number of symbols from a subframe assigned for downlink transmission 1304. Moreover, logical grouping 1302 can include an electrical component for recognizing a user equipment specific reference signal (UE-RS) pattern based upon the number of symbols from the subframe assigned for downlink transmission, wherein at least one time domain component of the UE-RS pattern varies based upon the number of symbols from the subframe assigned for downlink transmission 1306. Further, logical grouping 1302 can include an electrical component for detecting UE-RSs on resource elements (REs) of the subframe specified by the UE-RS pattern 1308. Moreover, logical grouping 1302 can include an electrical component for estimating a channel based upon the UE-RSs 1310. Additionally, system 1300 can include a memory 1312 that retains instructions for executing functions associated with electrical components 1304, 1306, 1308, and 1310. While shown as being external to memory 1312, it is to be understood that one or more of electrical components 1304, 1306, 1308, and 1310 can exist within memory 1312.

Figure 14:
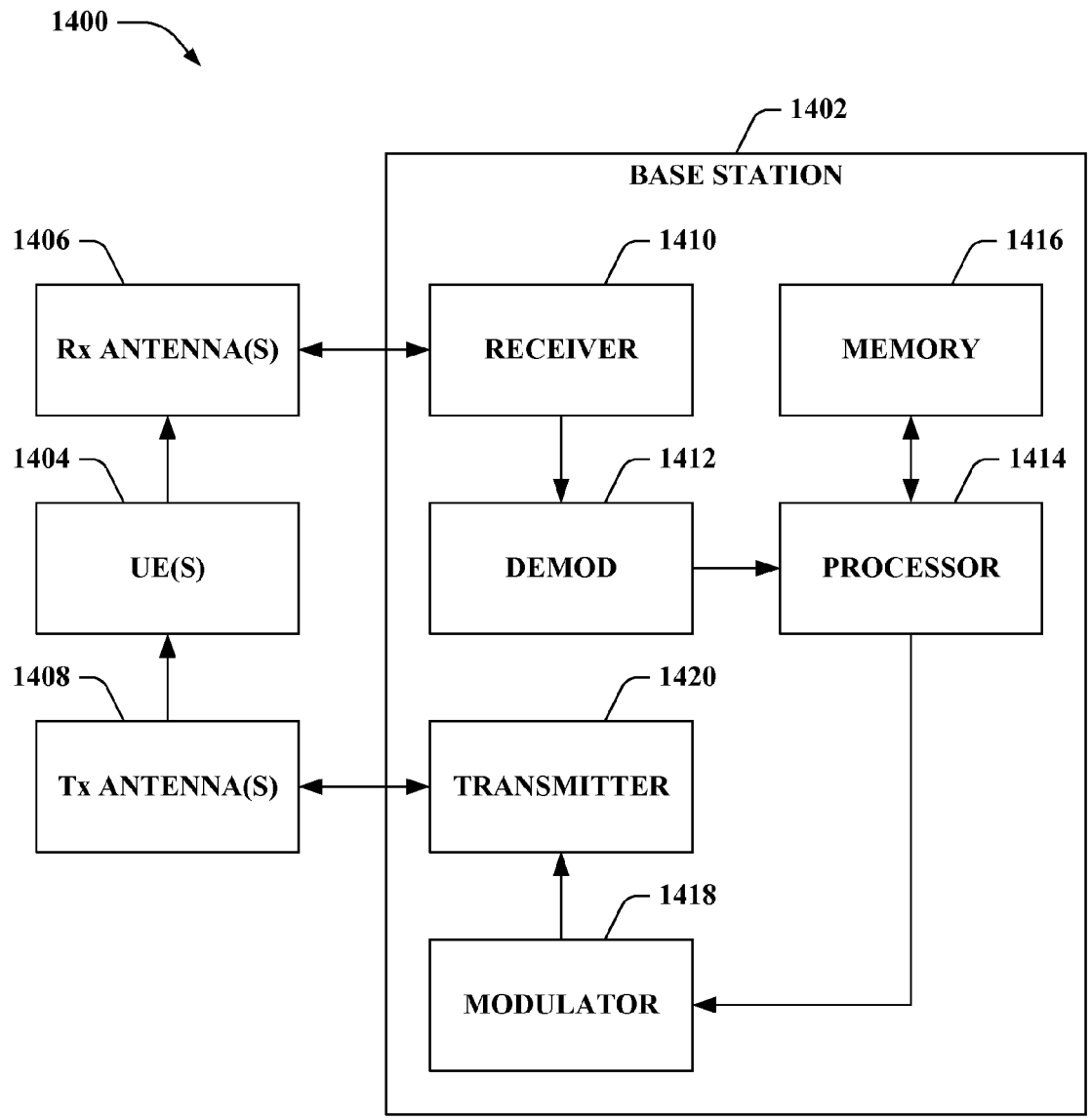
FIGS. 14-15 are illustrations of example systems that can be utilized to implement various aspects of the functionality described herein.

FIG. 14 is an illustration of a system 1400 that can be utilized to implement various aspects of the functionality described herein. System 1400 can include a base station 1402 (e.g., base station 302, . . . ). Base station 1402 can receive signal(s) from one or more UEs 1404 via one or more receive (Rx) antennas 1406 and transmit to the one or more UEs 1404 via one or more transmit (Tx) antennas 1408. Further, base station 1402 can include a receiver 1410 that receives information from receive antenna(s) 1406. According to an example, receiver 1410 can be operatively associated with a demodulator (demod) 1412 that demodulates received information. Demodulated symbols can be analyzed by a processor 1414. Processor 1414 can be coupled to memory 1416, which can store data to be transmitted to or received from UE(s) 1404 and/or any other suitable protocols, algorithms, information, etc. related to performing the various actions and functions set forth herein. For example, base station 1402 can employ processor 1414 to perform methodology 1000 and/or other similar and appropriate methodologies. Base station 1402 can further include a modulator 1418 that can multiplex a signal for transmission by a transmitter 1420 through antenna(s) 1408.

Processor 1414 can be a processor dedicated to analyzing information received by receiver 1410, dedicated to generating information for transmission by transmitter 1420, or dedicated to controlling one or more modules of base station 1402. According to another example, processor 1414 can analyze information received by receiver 1410, generate information for transmission by transmitter 1420, and control one or more modules of base station 1402. The one or more modules of base station 1402 can include, for example, a PDCP module, an RLC module, a physical layer module, a coding module, a modulation module, a mapping module, a scheduler, a pattern selection module, and/or a dedicated reference signal module. Moreover, although not shown, it is contemplated that the one or more modules of base station 1402 can be part of processor 1414 or a plurality of processors (not shown).

Figure 15:
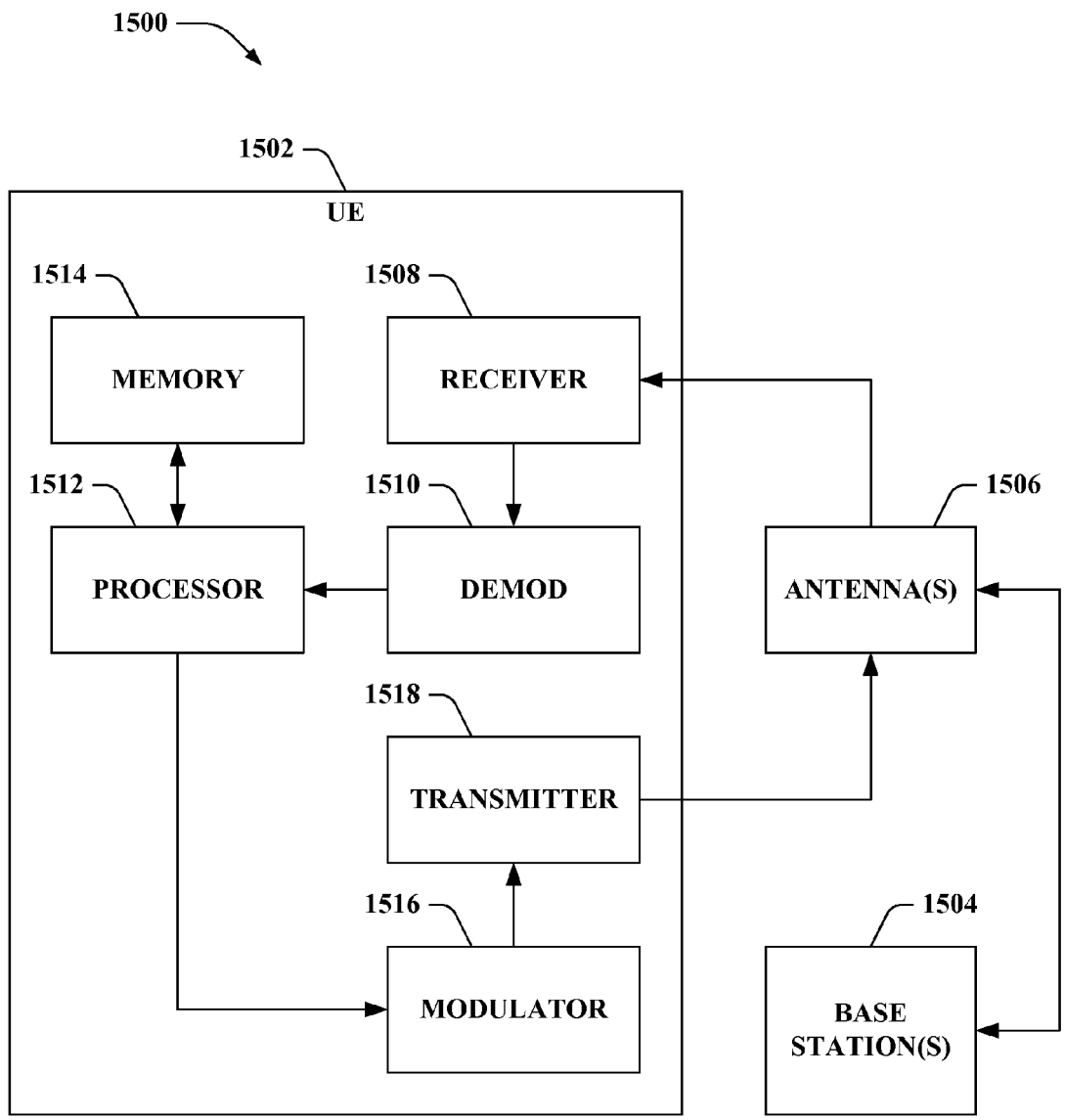

FIG. 15 is an illustration of a system 1500 that can be utilized to implement various aspects of the functionality described herein. System 1500 can include a UE 1502 (e.g., UE 304, . . . ). UE 1502 can receive signal(s) from one or more base stations 1504 and/or transmit to one or more base stations 1504 via one or more antennas 1506. Further, UE 1502 can include a receiver 1508 that receives information from antenna(s) 1506. According to an example, receiver 1508 can be operatively associated with a demodulator (demod) 1510 that demodulates received information. Demodulated symbols can be analyzed by a processor 1512. Processor 1512 can be coupled to memory 1514, which can store data to be transmitted to or received from base station(s) 1504 and/or any other suitable protocols, algorithms, information, etc. related to performing the various actions and functions set forth herein. For example, UE 1502 can employ processor 1512 to perform methodology 1100 and/or other similar and appropriate methodologies. UE 1502 can further include a modulator 1516 that can multiplex a signal for transmission by a transmitter 1518 through antenna(s) 1506.

Processor 1512 can be a processor dedicated to analyzing information received by receiver 1508, dedicated to generating information for transmission by transmitter 1518, or dedicated to controlling one or more modules of UE 1502. According to another example, processor 1512 can analyze information received by receiver 1508, generate information for transmission by transmitter 1518, and control one or more modules of UE 1502. The one or more modules of UE 1502 can include, for example, a PDCP module, an RLC module, a physical layer module, a coding module, a modulation module, a mapping module, an assignment analysis module, a reference signal evaluation module, and/or a channel estimation module. Moreover, although not shown, it is contemplated that the one or more modules of UE 1502 can be part of processor 1512 or a plurality of processors (not shown).

Figure 16:
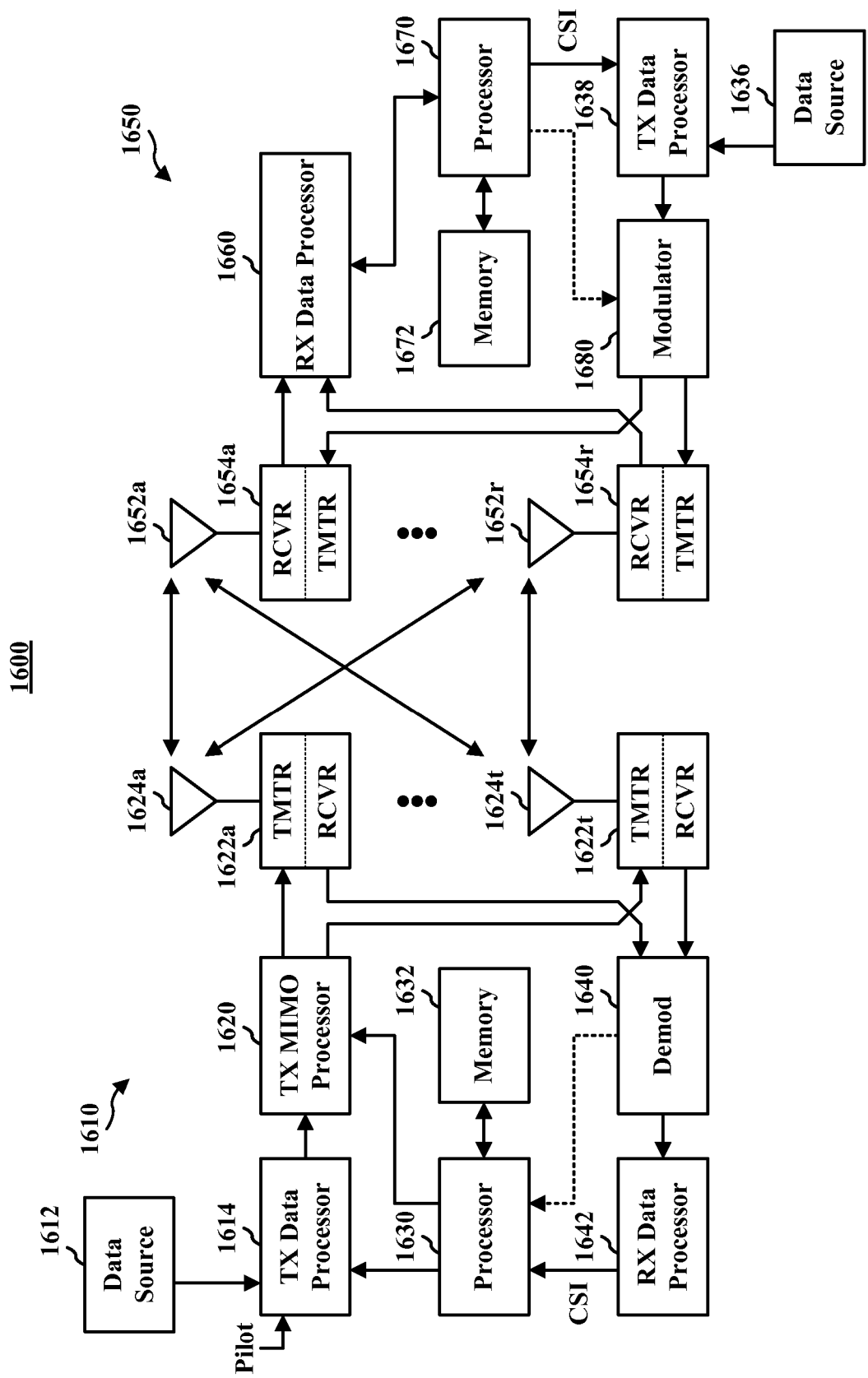
FIG. 16 is an illustration of an example wireless communication system that can be employed in conjunction with the various systems and methods described herein.

FIG. 16 shows an example wireless communication system 1600. Wireless communication system 1600 depicts one base station 1610 and one UE 1650 for sake of brevity. However, it is to be appreciated that system 1600 can include more than one base station and/or more than one UE, wherein additional base stations and/or UEs can be substantially similar or different from example base station 1610 and UE 1650 described below. In addition, it is to be appreciated that base station 1610 and/or UE 1650 can employ the systems (FIGS. 1-3 and 12-15) and/or methods (FIGS. 10-11) described herein to facilitate wireless communication there between.

At base station 1610, traffic data for a number of data streams is provided from a data source 1612 to a transmit (TX) data processor 1614. According to an example, each data stream can be transmitted over a respective antenna. TX data processor 1614 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at UE 1650 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1630.

The modulation symbols for the data streams can be provided to a TX MIMO processor 1620, which can further process the modulation symbols (e.g., for OFDM). TX MIMO processor 1620 then provides $N_T$ modulation symbol streams to $N_T$ transmitters (TMTR) 1622*a* through 1622*t*. In various embodiments, TX MIMO processor 1620 applies beamforming weights to the symbols of the data streams and to the antenna from which the symbol is being transmitted.

Each transmitter 1622 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1622*a* through 1622*t* are transmitted from $N_T$ antennas 1624*a* through 1624*t*, respectively.

At UE 1650, the transmitted modulated signals are received by $N_R$ antennas 1652*a* through 1652*r* and the received signal from each antenna 1652 is provided to a respective receiver (RCVR) 1654*a* through 1654*r*. Each receiver 1654 conditions (e.g., filters, amplifies, and down-converts) a respective signal, digitizes the conditioned signal to provide samples, and further processes the samples to provide a corresponding "received" symbol stream.

An RX data processor 1660 can receive and process the $N_R$ received symbol streams from $N_R$ receivers 1654 based on a particular receiver processing technique to provide $N_T$ "detected" symbol streams. RX data processor 1660 can demodulate, deinterleave, and decode each detected symbol stream to recover the traffic data for the data stream. The processing by RX data processor 1660 is complementary to that performed by TX MIMO processor 1620 and TX data processor 1614 at base station 1610.

A processor 1670 can periodically determine which available technology to utilize as discussed above. Further, processor 1670 can formulate a reverse link message comprising a matrix index portion and a rank value portion.

The reverse link message can comprise various types of information regarding the communication link and/or the received data stream. The reverse link message can be processed by a TX data processor 1638, which also receives traffic data for a number of data streams from a data source 1636, modulated by a modulator 1680, conditioned by transmitters 1654*a* through 1654*r*, and transmitted back to base station 1610.

At base station 1610, the modulated signals from UE 1650 are received by antennas 1624, conditioned by receivers 1622, demodulated by a demodulator 1640, and processed by a RX data processor 1642 to extract the reverse link message transmitted by UE 1650. Further, processor 1630 can process the extracted message to determine which precoding matrix to use for determining the beamforming weights.

Processors 1630 and 1670 can direct (e.g., control, coordinate, manage, etc.) operation at base station 1610 and UE 1650, respectively. Respective processors 1630 and 1670 can be associated with memory 1632 and 1672 that store program codes and data. Processors 1630 and 1670 can also perform computations to derive frequency and impulse response estimates for the uplink and downlink, respectively.

It is to be understood that the aspects described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates sending reference signals for channel estimation in a wireless communication environment, comprising:
identifying a number of symbols from a subframe utilized for downlink transmission;
selecting a user equipment specific reference signal (UE-RS) pattern based upon the number of symbols from the subframe utilized for the downlink transmission, wherein at least one time domain component of the UE-RS pattern varies based upon the number of symbols from the subframe utilized for the downlink transmission; and mapping UE-RSs to resource elements of the subframe as a function of the UE-RS pattern.

2. The method of claim 1, wherein the subframe is a regular subframe and all symbols from the subframe are identified as being utilized for the downlink transmission.

3. The method of claim 1, wherein the subframe includes a Downlink Pilot Timeslot (DwPTS) and the number of symbols from the subframe utilized for the downlink transmission are identified as being a number of symbols included in the DwPTS as configured.

4. The method of claim 1, wherein the subframe is sent to a relay and includes one or more symbols reserved as gap symbols.

5. The method of claim 1, wherein a time domain component of the UE-RS pattern includes code division multiplexing (CDM) groups on a same set of symbols.

6. The method of claim 1, wherein frequency domain components of the UE-RS pattern are unchanged based upon the number of symbols from the subframe utilized for the downlink transmission.

7. The method of claim 1, wherein the at least one time domain component of the UE-RS pattern is varied based upon the number of symbols from the subframe utilized for the downlink transmission by time-shifting the at least one time domain component of the UE-RS pattern.

8. The method of claim 7, wherein a set of time domain components of the UE-RS pattern are time-shifted by a common number of symbols.

9. The method of claim 7, wherein a set of time domain components of the UE-RS pattern are time-shifted by differing, respective numbers of symbols.

10. The method of claim 7, wherein the at least one time domain component of the UE-RS pattern is time-shifted, and at least one disparate time domain component is unchanged in time.

11. The method of claim 1, wherein the at least one time domain component of the UE-RS pattern is varied based upon the number of symbols from the subframe utilized for the downlink transmission by puncturing one time domain component of the UE-RS pattern.

12. The method of claim 1, wherein the UE-RS pattern is selected based upon whether the downlink transmission is sent to one of a relay or a user equipment.

13. A wireless communications apparatus, comprising:
a memory that retains instructions related to identifying a number of symbols from a subframe utilized for downlink transmission, selecting a user equipment specific reference signal (UE-RS) pattern based upon the number of symbols from the subframe utilized for the downlink transmission, wherein at least one time domain component of the UE-RS pattern varies based upon the number of symbols from the subframe utilized for the downlink transmission, and mapping UE-RSs to resource elements of the subframe as a function of the UE-RS pattern; and
a processor, coupled to the memory, configured to execute the instructions retained in the memory.

14. The wireless communications apparatus of claim 13, wherein the subframe is one of a regular subframe, a subframe that includes a Downlink Pilot Timeslot (DwPTS), or a subframe sent to a relay that includes one or more symbols reserved as gap symbols.

15. The wireless communications apparatus of claim 13, wherein a time domain component of the UE-RS pattern includes code division multiplexing (CDM) groups on a same set of symbols.

16. The wireless communications apparatus of claim 13, wherein frequency domain components of the UE-RS pattern are unchanged based upon the number of symbols from the subframe utilized for the downlink transmission.

17. The wireless communications apparatus of claim 13, wherein the at least one time domain component of the UE-RS pattern is varied based upon the number of symbols from the subframe utilized for the downlink transmission by time-shifting the at least one time domain component of the UE-RS pattern.

18. The wireless communications apparatus of claim 17, wherein a set of time domain components of the UE-RS pattern are time-shifted by a common number of symbols.

19. The wireless communications apparatus of claim 17, wherein a set of time domain components of the UE-RS pattern are time-shifted by differing, respective numbers of symbols.

20. The wireless communications apparatus of claim 17, wherein the at least one time domain component of the UE-RS pattern is time-shifted, and at least one disparate time domain component is unchanged in time.

21. The wireless communications apparatus of claim 13, wherein the at least one time domain component of the UE-RS pattern is varied based upon the number of symbols from the subframe utilized for the downlink transmission by puncturing one time domain component of the UE-RS pattern.

22. The wireless communications apparatus of claim 13, wherein the UE-RS pattern is selected based upon whether the downlink transmission is sent to one of a relay or a user equipment.

23. A wireless communications apparatus that enables sending reference signals in a wireless communication environment, comprising:
means for identifying a number of symbols from a subframe utilized for downlink transmission;
means for selecting a user equipment specific reference signal (UE-RS) pattern based upon the number of symbols from the subframe utilized for the downlink transmission, wherein at least one time domain component of the UE-RS pattern varies based upon the number of symbols from the subframe utilized for the downlink transmission; and
means for mapping UE-RSs to resource elements of the subframe as a function of the UE-RS pattern.

24. The wireless communications apparatus of claim 23, wherein a time domain component of the UE-RS pattern includes code division multiplexing (CDM) groups on a same set of symbols.

25. The wireless communications apparatus of claim 23, wherein the at least one time domain component of the UE-RS pattern is varied based upon the number of symbols from the subframe utilized for the downlink transmission by time-shifting the at least one time domain component of the UE-RS pattern.

26. The wireless communications apparatus of claim 23, wherein the at least one time domain component of the UE-RS pattern is varied based upon the number of symbols from the subframe utilized for the downlink transmission by puncturing one time domain component of the UE-RS pattern.

27. A computer program product, comprising:
a non-transitory computer-readable medium comprising:
code for identifying a number of symbols from a subframe utilized for downlink transmission;
code for selecting a user equipment specific reference signal (UE-RS) pattern based upon the number of symbols from the subframe utilized for the downlink transmission, wherein at least one time domain component of the UE-RS pattern varies based upon the number of symbols from the subframe utilized for the downlink transmission; and code for mapping UE-RSs to resource elements of the subframe as a function of the UE-RS pattern.

28. The computer program product of claim 27, wherein a time domain component of the UE-RS pattern includes code division multiplexing (CDM) groups on a same set of symbols.

29. The computer program product of claim 27, wherein the at least one time domain component of the UE-RS pattern is varied based upon the number of symbols from the subframe utilized for the downlink transmission by time-shifting the at least one time domain component of the UE-RS pattern.

30. The computer program product of claim 27, wherein the at least one time domain component of the UE-RS pattern is varied based upon the number of symbols from the subframe utilized for the downlink transmission by puncturing one time domain component of the UE-RS pattern.

31. A wireless communications apparatus, comprising:
a processor, coupled to a memory, configured to:
  identify a number of symbols from a subframe utilized for downlink transmission;
  select a user equipment specific reference signal (UE-RS) pattern based upon the number of symbols from the subframe utilized for the downlink transmission, wherein at least one time domain component of the UE-RS pattern varies based upon the number of symbols from the subframe utilized for the downlink transmission; and
  map UE-RSs to resource elements of the subframe as a function of the UE-RS pattern.

32. The wireless communications apparatus of claim 31, wherein the at least one time domain component of the UE-RS pattern is varied based upon the number of symbols from the subframe utilized for the downlink transmission by one or more of time-shifting the at least one time domain component of the UE-RS pattern or puncturing one time domain component of the UE-RS pattern.

33. A method that facilitates estimating a channel in a wireless communication environment, comprising:
  identifying a number of symbols from a subframe assigned for downlink transmission;
  recognizing a user equipment specific reference signal (UE-RS) pattern based upon the number of symbols from the subframe assigned for the downlink transmission, wherein at least one time domain component of the UE-RS pattern varies based upon the number of symbols from the subframe assigned for the downlink transmission;
  detecting UE-RSs on resource elements of the subframe specified by the UE-RS pattern; and
  estimating a channel based upon the UE-RSs.

34. The method of claim 33, wherein a time domain component of the UE-RS pattern includes code division multiplexing (CDM) groups on a same set of symbols.

35. The method of claim 33, wherein frequency domain components of the UE-RS pattern are unchanged based upon the number of symbols from the subframe utilized for the downlink transmission.

36. The method of claim 33, wherein the at least one time domain component of the UE-RS pattern is varied based upon the number of symbols from the subframe utilized for the downlink transmission by time-shifting the at least one time domain component of the UE-RS pattern.

37. The method of claim 36, wherein a set of time domain components of the UE-RS pattern are time-shifted by a common number of symbols.

38. The method of claim 36, wherein a set of time domain components of the UE-RS pattern are time-shifted by differing, respective numbers of symbols.

39. The method of claim 36, wherein the at least one time domain component of the UE-RS pattern is time-shifted, and at least one disparate time domain component is unchanged in time.

40. The method of claim 33, wherein the at least one time domain component of the UE-RS pattern is varied based upon the number of symbols from the subframe utilized for the downlink transmission by puncturing one time domain component of the UE-RS pattern.

41. The method of claim 33, wherein the subframe is one of a regular subframe, a subframe that includes a Downlink Pilot Timeslot (DwPTS), or a subframe sent to a relay that includes one or more symbols reserved as gap symbols.

42. A wireless communications apparatus, comprising:
  a memory that retains instructions related to identifying a number of symbols from a subframe assigned for downlink transmission, recognizing a user equipment specific reference signal (UE-RS) pattern based upon the number of symbols from the subframe assigned for the downlink transmission, wherein at least one time domain component of the UE-RS pattern varies based upon the number of symbols from the subframe assigned for the downlink transmission, detecting UE-RSs on resource elements of the subframe specified by the UE-RS pattern, and estimating a channel based upon the UE-RSs; and
  a processor, coupled to the memory, configured to execute the instructions retained in the memory.

43. The wireless communications apparatus of claim 42, wherein a time domain component of the UE-RS pattern includes code division multiplexing (CDM) groups on a same set of symbols.

44. The wireless communications apparatus of claim 42, wherein the at least one time domain component of the UE-RS pattern is varied based upon the number of symbols from the subframe utilized for the downlink transmission by time-shifting the at least one time domain component of the UE-RS pattern.

45. The wireless communications apparatus of claim 42, wherein the at least one time domain component of the UE-RS pattern is varied based upon the number of symbols from the subframe utilized for the downlink transmission by puncturing one time domain component of the UE-RS pattern.

46. A wireless communications apparatus that enables estimating a channel in a wireless communication environment, comprising:
  means for identifying a number of symbols from a subframe assigned for downlink transmission;
  means for recognizing a user equipment specific reference signal (UE-RS) pattern based upon the number of symbols from the subframe assigned for the downlink transmission, wherein at least one time domain component of the UE-RS pattern varies based upon the number of symbols from the subframe assigned for the downlink transmission;
  means for detecting UE-RSs on resource elements of the subframe specified by the UE-RS pattern; and
  means for estimating a channel based upon the UE-RSs.

47. The wireless communications apparatus of claim 46, wherein the at least one time domain component of the UE-RS pattern is varied based upon the number of symbols from the subframe utilized for the downlink transmission by one or more of time-shifting the at least one time domain component of the UE-RS pattern or puncturing one time domain component of the UE-RS pattern.

48. A computer program product, comprising:
- a non-transitory computer-readable medium comprising:
  - code for identifying a number of symbols from a subframe assigned for downlink transmission;
  - code for recognizing a user equipment specific reference signal (UE-RS) pattern based upon the number of symbols from the subframe assigned for the downlink transmission, wherein at least one time domain component of the UE-RS pattern varies based upon the number of symbols from the subframe assigned for the downlink transmission;
  - code for detecting UE-RSs on resource elements of the subframe specified by the UE-RS pattern; and
  - code for estimating a channel based upon the UE-RSs.

49. The computer program product of claim 48, wherein the at least one time domain component of the UE-RS pattern is varied based upon the number of symbols from the subframe utilized for the downlink transmission by one or more of time-shifting the at least one time domain component of the UE-RS pattern or puncturing one time domain component of the UE-RS pattern.

50. A wireless communications apparatus, comprising:
- a processor, coupled to a memory, configured to:
  - identify a number of symbols from a subframe assigned for downlink transmission;
  - recognize a user equipment specific reference signal (UE-RS) pattern based upon the number of symbols from the subframe assigned for the downlink transmission, wherein at least one time domain component of the UE-RS pattern varies based upon the number of symbols from the subframe assigned for the downlink transmission;
  - detect UE-RSs on resource elements of the subframe specified by the UE-RS pattern; and
  - estimate a channel based upon the UE-RSs.

* * * * *